United States Patent [19]
Hess et al.

[11] Patent Number: 6,157,894
[45] Date of Patent: Dec. 5, 2000

[54] LIQUID GAUGING USING SENSOR FUSION AND DATA FUSION

[75] Inventors: Robert Alan Hess, Vergennes; Mark George Walker, Castleton; Radoslaw Romuald Zakrzewski, South Burlington, all of Vt.; Luis Carlos Rabelo, Copley, Ohio; Robert Curtis North, Ferrisburg; Scott Robert Durkee, New Haven, both of Vt.

[73] Assignee: Simmonds Precision Products, Inc., Charlotte, N.C.

[21] Appl. No.: 08/996,858

[22] Filed: Dec. 23, 1997

[51] Int. Cl.[7] .................................................. G01F 17/00
[52] U.S. Cl. .............................. 702/54; 702/50; 702/55; 702/99; 702/141; 73/290 R; 73/292
[58] Field of Search .......................... 702/54, 173, 55, 702/50, 52, 99, 104, 130, 141; 73/292, 291, 301, 304 R, 290 R, 314

[56] References Cited

U.S. PATENT DOCUMENTS

| | | |
|---|---|---|
| 4,208,906 | 6/1980 | Roberts, Jr. . |
| 4,739,494 | 4/1988 | Torii ........................................ 702/173 |
| 4,976,377 | 12/1990 | Higuchi et al. . |
| 4,987,888 | 1/1991 | Funabashi et al. . |
| 5,094,213 | 3/1992 | Dudek et al. . |
| 5,207,099 | 5/1993 | Baker ....................................... 73/292 |
| 5,273,019 | 12/1993 | Matthews et al. . |
| 5,293,553 | 3/1994 | Dudek et al. . |
| 5,474,261 | 12/1995 | Stolarczyk et al. . |
| 5,524,599 | 6/1996 | Kong et al. . |
| 5,535,135 | 7/1996 | Bush et al. . |
| 5,832,468 | 11/1998 | Miller et al. ................................ 706/23 |

FOREIGN PATENT DOCUMENTS

| | | |
|---|---|---|
| 3537088 | 4/1987 | Germany . |
| 2289542 | 11/1995 | United Kingdom . |

OTHER PUBLICATIONS

PCT International Search Report.

*Primary Examiner*—Kamini Shah
*Assistant Examiner*—Hien Vo
*Attorney, Agent, or Firm*—James M. Rashid; Calfee, Halter & Griswold LLP

[57] ABSTRACT

Liquid gauging system for liquid in a container includes a plurality of sensors; each of the sensors measuring a respective parameter of the liquid in the container and producing a sensor output related to its measured parameter; there being at least two sensors that measure different parameters of the liquid; and a processor that receives the sensor outputs and determines, based on the sensor outputs, a quantity of the liquid in the container; the processor determining the quantity by executing at least one sensor fusion algorithm that is based on a set of relationships between the measured parameters and the quantity. The gauging system can also include a data fusion process for determining quantity based on a plurality of quantity measurements.

71 Claims, 13 Drawing Sheets

$$h_{1vos} = VOS_1 \, t_{1vos} \qquad h_{1f} = VOS_1 \, t_{1f}$$

$$h_{2vos} = VOS_2 \, t_{2vos} \qquad h_{2f} = VOS_2 \, t_{2f}$$

$$VOS = f_{vos}(T, \rho)$$

$$P = h_p \rho |a|$$

$$h_p = f_{h1}(a, h_{1f}) \qquad h_p = f_{h2}(a, h_{2f})$$

$$V = f_{v1}(a, h_{1f}) \qquad V = f_{v2}(a, h_{2f}) \qquad V = f_{v3}(h_{1f}, h_{2f}, h_p)$$

$$M = V * \rho$$

WHERE:

$h_{1vos}$ = KNOWN HEIGHT OF VOS TARGET FOR ULTRASONIC SENSOR 1

$h_{2vos}$ = KNOWN HEIGHT OF VOS TARGET FOR ULTRASONIC SENSOR 2

$T_{1vos}$ = MEASURED ECHO TIME TO VOS TARGET FOR ULTRASONIC SENSOR 1

$T_{2vos}$ = MEASURED ECHO TIME TO VOS TARGET FOR ULTRASONIC SENSOR 2

$v_1$ = VELOCITY OF SOUND TO VOS TARGET FOR ULTRASONIC SENSOR 1

$v_2$ = VELOCITY OF SOUND TO VOS TARGET FOR ULTRASONIC SENSOR 2

$h_{1f}$ = HEIGHT OF FUEL PLANE AT ULTRASONIC SENSOR 1

$h_{2f}$ = HEIGHT OF FUEL PLANE AT ULTRASONIC SENSOR 2

$T_{1f}$ = MEASURED ECHO TIME TO FUEL PLANE AT ULTRASONIC SENSOR 1

$T_{2f}$ = MEASURED ECHO TIME TO FUEL PLANE AT ULTRASONIC SENSOR 2

$T$ = MEASURED TEMPERATURE $P$ = MEASURED PRESSURE $\rho$ = DENSITY $a$ = MEASURED ACCELERATION $h_p$ = HEIGHT OF FUEL PLANE AT PRESSURE SENSOR $V$ = VOLUME, $m$ = MASS

*Fig. 2B*

$$Z_m = \begin{bmatrix} t_{vos11} \\ t_{vos12} \\ t_{vos21} \\ t_{vos22} \\ t_{f1} \\ t_{f2} \\ P \\ T_{u1} \\ T_{u2} \\ T_P \\ \vec{a}_{u1} \\ \vec{a}_{u2} \\ \vec{a}_{u3} \end{bmatrix} = g(x_k) = \begin{bmatrix} \frac{2h_{11}}{vos} \\ \frac{2h_{12}}{vos} \\ \frac{2h_{21}}{vos} \\ \frac{2h_{22}}{vos} \\ 2\perp(A.B.D)_{u1}/vos \\ 2\perp(A.B.D)_{u2}/vos \\ \perp(A.B.D)_P \; a\rho \\ K_0 + K_1\rho + K_2 vos \\ K_0 + K_1\rho + K_2 vos \\ K_0 + K_1\rho + K_2 vos \\ (A.B. \sqrt{1-A^2-B^2}\,) \, a \\ (A.B. \sqrt{1-A^2-B^2}\,) \, a \\ (A.B. \sqrt{1-A^2-B^2}\,) \, a \end{bmatrix}$$

WHERE:
$K_0 = -28.164$
$K_1 = 79.155$
$K_2 = -0.009311$ $\perp(A.B.D)_{u1}$ = PERPENDICULAR DISTANCE OF $u_1$ SENSOR FROM SURFACE $\perp(A.B.D)_{u2}$ = PERPENDICULAR DISTANCE OF $u_2$ SENSOR FROM SURFACE $\perp(A.B.D)_P$ = PERPENDICULAR DISTANCE OF PRESSURE SENSOR FROM SURFACE AND: $x_k = \begin{bmatrix} vos \\ \rho \\ A \\ B \\ D \\ a \end{bmatrix}$

A = SIN(ROLL) • COS(PITCH)

B = SIN(PITCH)

D = HEIGHT COEFFICIENT OF FUEL PLANE ALONG A UNIT VECTOR FORMED BY (A.B. $\sqrt{1-A^2-B^2}$ )

Fig. 8

JACOBIAN MATRIX $\left.\dfrac{\partial g(x)}{\partial x}\right|_{x = x_{k+1|k}}$ $$\begin{bmatrix} \dfrac{-2}{VOS^2} h_{11} & 0 & 0 \\[6pt] \dfrac{-2}{VOS^2} h_{12} & 0 & 0 \\[6pt] \dfrac{-2}{VOS^2} h_{21} & 0 & 0 \\[6pt] \dfrac{-2}{VOS^2} h_{22} & 0 & 0 \\[6pt] \dfrac{-2 \perp (A.B.D.u_1)}{VOS^2} & 0 & \dfrac{2}{VOS}\left(-u_{1x} + \dfrac{Au_{1z}}{\sqrt{1-A^2-B^2}}\right) \\[10pt] \dfrac{-2 \perp (A.B.D.u_2)}{VOS^2} & 0 & \dfrac{2}{VOS}\left(-u_{2x} + \dfrac{Au_{2z}}{\sqrt{1-A^2-B^2}}\right) \\[10pt] 0 & \perp (A.B.D.u_p)a & \left(-u_{px} + \dfrac{Au_{pz}}{\sqrt{1-A^2-B^2}}\right)a\rho \\[10pt] K_2 & K_1 & 0 \\ K_2 & K_1 & 0 \\ K_2 & K_1 & 0 \\[4pt] \overline{0} & \overline{0} & -(1.0. \dfrac{A}{\sqrt{1-A^2-B^2}})\,a \\[10pt] \overline{0} & \overline{0} & -(1.0. \dfrac{A}{\sqrt{1-A^2-B^2}})\,a \\[10pt] \overline{0} & \overline{0} & -(1.0. \dfrac{A}{\sqrt{1-A^2-B^2}})\,a \end{bmatrix}$$

MATCH TO FIG. 9B

Fig. 9A

MATCH TO FIG.9A $$\begin{bmatrix} 0 & 0 & 0 \\ 0 & 0 & 0 \\ 0 & 0 & 0 \\ 0 & 0 & 0 \\ \frac{2}{v_{OS}}\left[-u_{1y}+\frac{Bu_{1z}}{\sqrt{1-A^2-B^2}}\right] & \frac{2}{v_{OS}} & 0 \\ \frac{2}{v_{OS}}\left[-u_{2y}+\frac{Bu_{2z}}{\sqrt{1-A^2-B^2}}\right] & \frac{2}{v_{OS}} & 0 \\ \left[-u_{py}+\frac{Bu_{pz}}{\sqrt{1-A^2-B^2}}\right]a\rho & a\rho & \perp(A,B,D,u_p)\rho \\ 0 & 0 & 0 \\ 0 & 0 & 0 \\ 0 & 0 & 0 \\ -(1.0,\frac{B}{\sqrt{1-A^2-B^2}})a & \overline{0} & -(A,B,\sqrt{1-A^2-B^2}) \\ -(1.0,\frac{B}{\sqrt{1-A^2-B^2}})a & \overline{0} & -(A,B,\sqrt{1-A^2-B^2}) \\ -(1.0,\frac{B}{\sqrt{1-A^2-B^2}})a & \overline{0} & -(A,B,\sqrt{1-A^2-B^2}) \end{bmatrix}$$

Fig. 9B $$\phi_k = \begin{bmatrix} 1 & & & & \\ & \cdot & & & \\ & & \cdot & & \\ & & & \cdot & \\ & & & & 1 \end{bmatrix}$$

Fig. 10

$$Z_k = \begin{bmatrix} m_1 \\ m_2 \\ \vdots \\ m_i \end{bmatrix}$$

Fig. 11

$$H_k = \begin{bmatrix} 1 & & & & \\ & \cdot & & & \\ & & \cdot & & \\ & & & \cdot & \\ & & & & 1 \end{bmatrix}$$

Fig. 12

LIQUID GAUGING USING SENSOR FUSION AND DATA FUSION

RELATED APPLICATIONS

This patent application is related to the following U.S. patent applications Ser. No. 08/997,444, entitled IMPROVED ULTRASONIC LIQUID GAUGING SYSTEM; Ser. No. 08/997,444, entitled PROBE PLACEMENT USING GENETIC ALGORITHM ANALYSIS now issued as U.S. Pat. No. 6,006,605; Ser. No. 08/997,157 entitled BLACKBOARD CENTRIC LAYERED SOFTWARE ARCHITECTURE FOR AN EMBEDDED AIRBORNE FUEL GAUGING SUBSYSTEM; and Ser. No. 08/997,271, entitled UNIVERSAL SENSOR INTERFACE SYSTEM AND METHOD; all of which applications were filed on even date herewith and are owned in common by the assignee of the present invention, the entire disclosures all of which are fully incorporated herein by reference.

TECHNICAL FIELD

The invention relates generally to liquid gauging systems such as can be used, for example, for aircraft fuel gauging. More particularly, the invention relates to a liquid gauging system that uses sensor fusion and data fusion techniques with a plurality of sensors.

BACKGROUND OF THE INVENTION

Liquid gauging is the determination or measurement of a quantity of liquid in a container. The quantity of liquid in a container can be defined or expressed in different units of measure, such as volume, weight, mass and height of the liquid surface in the container. As an example, in aircraft applications, aircraft fuel is contained in a plurality of fuel tanks on the aircraft. Typically, it is the mass of fuel in a tank that determines in large measure the flight distance for the aircraft. Although a measure of the fuel volume and weight may also be useful, ultimately it is an accurate determination of the mass of fuel in the tanks that is of primary interest.

The measurement of fuel mass, or any liquid mass in a container, is a complicated process when a high accuracy is required. First and foremost is the observation that no sensor can directly measure mass of a liquid. The liquid mass must be calculated based on a measurement of parameters that are related to mass, such as by measuring the liquid volume and then either measuring or assuming a density value for the liquid. In aircraft fuel gauging, the process is complicated by numerous factors, including aircraft dynamics maneuvers, acceleration effects, and fuel density changes due to temperature, different fuel blends, pressure variations from altitude and atmospheric changes, to name a few of the more important variables. Aircraft fuel gauging is necessarily a dynamic process during flight. The problems associated with fuel gauging are exacerbated by the fact that most fuel tanks, particularly those in larger aircraft, whether the aircraft be commercial or military, can have very complicated geometric shapes and further typically include a number of interior structures.

Known liquid gauging systems typically gauge fuel by attempting to determine the height and orientation of the liquid surface in the container. Once the liquid surface plane is defined and located, the information can be converted to a volume and then mass. Such systems typically use ultrasonic sensors, or liquid height sensors such as elongated capacitance sensors, to determine height of the liquid in the container. Another known approach is to use pressure measurements to determine the location of the liquid surface plane in combination with a densitometer and acceleration.

All of these known approaches are fundamentally dependent on calculated volume and density values, which calculations are based on the output signals from various pressure, temperature and height-based sensors. Unfortunately, all sensors are inherently inaccurate to one degree or another, so that for the known systems, overall system accuracy is determined by the collective accuracy (or conversely, inaccuracy) of all the sensors. For dynamic systems such as are used in aircraft fuel gauging, not only are there these sensor inaccuracies but also there are all the dynamic parameters such as aircraft movement and environmental changes that often contribute an indeterminate amount of system level uncertainty into the measurements and the calculations based on those measurements. Yet a further level of complexity arises from the consideration that sensor accuracy can change over time, and sensors can fail. When these events occur, conventional fuel gauging systems can suffer a significant degradation in performance.

Merely adding more sensors for redundancy in conventional systems may provide some increase in reliability and fault tolerance, but the final fuel mass/volume determination will still be limited by the collective accuracy of the various sensors and system uncertainties. More accurate sensors are often developed, but usually at a significantly increased cost. Known gauging systems attempt to reduce the effects of sensor inaccuracy and system related uncertainties by developing or providing various compensation schemes. For example, density and pressure determinations may be compensated for temperature variations and fuel stratification within a tank. Or height calculations may be compensated for internal tank structures, tank geometry and acceleration effects during flight. Such attempts to compensate sensor data based on fluid dynamics and system uncertainties can be helpful but still tend to be limited in the extent to which such compensation can accommodate dynamic changes.

The objectives exist, therefore, for a wholly different approach to liquid gauging that significantly increases system accuracy while still using conventional system parameter measurements.

SUMMARY OF THE INVENTION

The present invention contemplates, in one embodiment, a liquid gauging system for liquid in a container, the system including a plurality of sensors; each of the sensors measuring a respective parameter of the liquid in the container and producing a sensor output related to its measured parameter; there being at least two sensors that measure different parameters of the liquid; and a processor that receives the sensor outputs and determines, based on the sensor outputs, quantity of the liquid in the container; the processor determining the quantity of the liquid in the container by executing at least one sensor fusion algorithm that is based on a set of relationships between the measured parameters and the quantity.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 2B is a list of system equations that define various relationships between desired output (quantity) and system parameters measured by the sensors of the fuel gauging system of FIGS. 2 and 2A;

FIG. 8 is a state diagram of a measurement vector and state vector for the exemplary fuel gauging system;

FIGS. 9a–9b are a Jacobian matrix used in the EKF algorithm of FIG. 7;

FIG. 10 is an exemplary state transformation matrix for a data fusion Kalman filter type algorithm.;

FIG. 11 is an exemplary state vector for the data fusion algorithm;

FIG. 12 is an exemplary measurement transformation matrix for the data fusion algorithm.

DETAILED DESCRIPTION OF THE INVENTION

Figure 1:
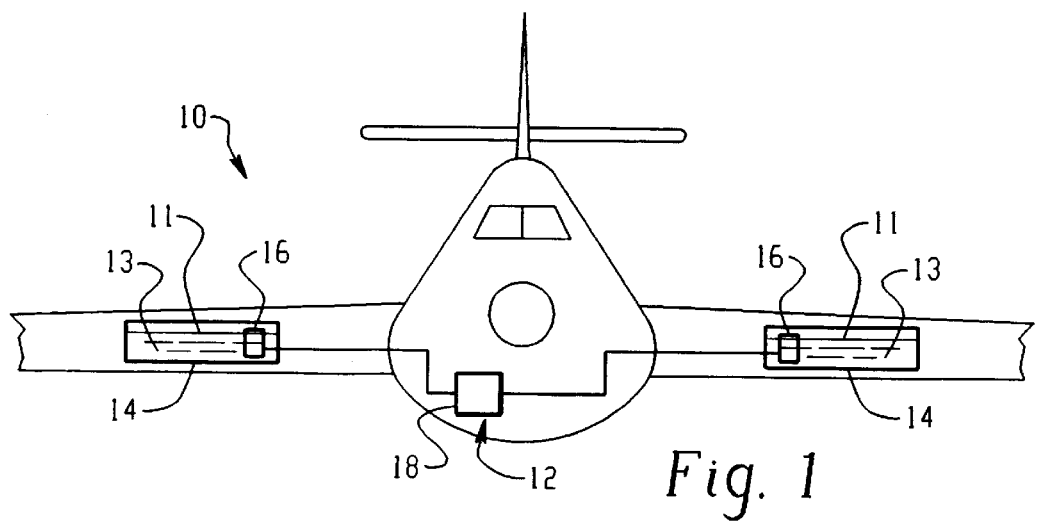
FIG. 1 is a simplified illustration of an aircraft fuel gauging system showing a typical environment.

With reference to FIG. 1, an embodiment of the invention is illustrated in an exemplary application, in this case for fuel gauging on an aircraft. Although the invention is described herein specifically in the context of aircraft fuel gauging, this is for purposes of illustration and explanation and should not be construed in a limiting sense. Those skilled in the art will appreciate that the present invention will have application to any liquid gauging application in which it is desired to determine the quantity of liquid in a container.

In FIG. 1 an aircraft 10 is shown with an on-board fuel measurement/gauging system 12 in accordance with the present invention. In this example, the gauging system 12 is used to determine quantity of a fuel 13 in one or more fuel tanks 14. The term "quantity" as used herein, either as fuel quantity or liquid quantity, refers to any units of measure or quantification of the liquid 13 that defines its volume, weight, mass or combination thereof. The basic relationships are:

$$\text{Mass} = \text{Volume} * \text{Density or } M = V * \rho \quad \text{Eq. 1}$$

and $$\text{Weight} = \text{Mass} * \text{Acceleration or } W = M * a \quad \text{Eq. 2}$$

The mass of the fuel 13 in a tank 14 is of particular interest because the total fuel mass determines the energy available to power the aircraft 10. Direct mass sensors in a dynamic environment such as an airplane are not available. Therefore, mass is a value derived from measurements and calculations of other parameters of the fuel 13 including density, acceleration and fuel height in the tank. These and other parameters are either measured by various sensors 16 (collectively designated in FIG. 1) including but not limited to pressure sensors, ultrasonic level sensors, accelerometers and temperature sensors, or derived from such measurements and other calculations. As used herein, a parameter of the liquid in the container, or a "liquid parameter" includes any characteristic of the liquid that can be measured, detected or derived by calculation or other technique. More particularly, a measured or detected liquid parameter includes any characteristic of the liquid (such as, for example, echo travel time, temperature, pressure, capacitance and so on) and/or an external parameter that acts on the liquid, such as for example, force of acceleration. These various parameters are exemplary in nature and are not intended to be exclusive or limiting in any sense. A derived parameter of the liquid is any parameter or characteristic or property of the liquid that is determined or calculated or otherwise derived from one or more of the measured parameters and/or other information available to the system, such as., for example, fuel plane height, density, and velocity of sound (VOS). Again these derived parameters are exemplary in nature and should not be construed in a limiting sense.

Some, one or all of the sensors 16 can be disposed inside a tank 14 if the sensor design so dictates. In accordance with one aspect of the present invention, however, it is contemplated that all of the sensors 16 will be non-intrusive, meaning that none of the sensors will need to be exposed electrically to the fuel 13 and/or otherwise installed or disposed inside a tank 14. In general, a non-intrusive sensor for purposes of this disclosure is a sensor that can be installed at and removed from its operational location with a tank 14 without having to remove fuel 13 from the tank 14 or without significant loss of fuel from the tank 14 when a sensor is removed, and/or is a sensor that operates without exposing the fuel 13 to electrical energy. But, it is important to note that the invention can be used with intrusive sensors also, if a particular application so requires.

The sensors 16 produce outputs, typically in the form of electrical signals, which are coupled or input to a fuel gauging processor 18. Typically, the processor 18 will be a computer or functionally similar electronic hardware and software combination that processes the sensor 16 outputs and determines quantity of the fuel 13 in a tank 14 in accordance with the techniques of the present invention.

Figure 2:
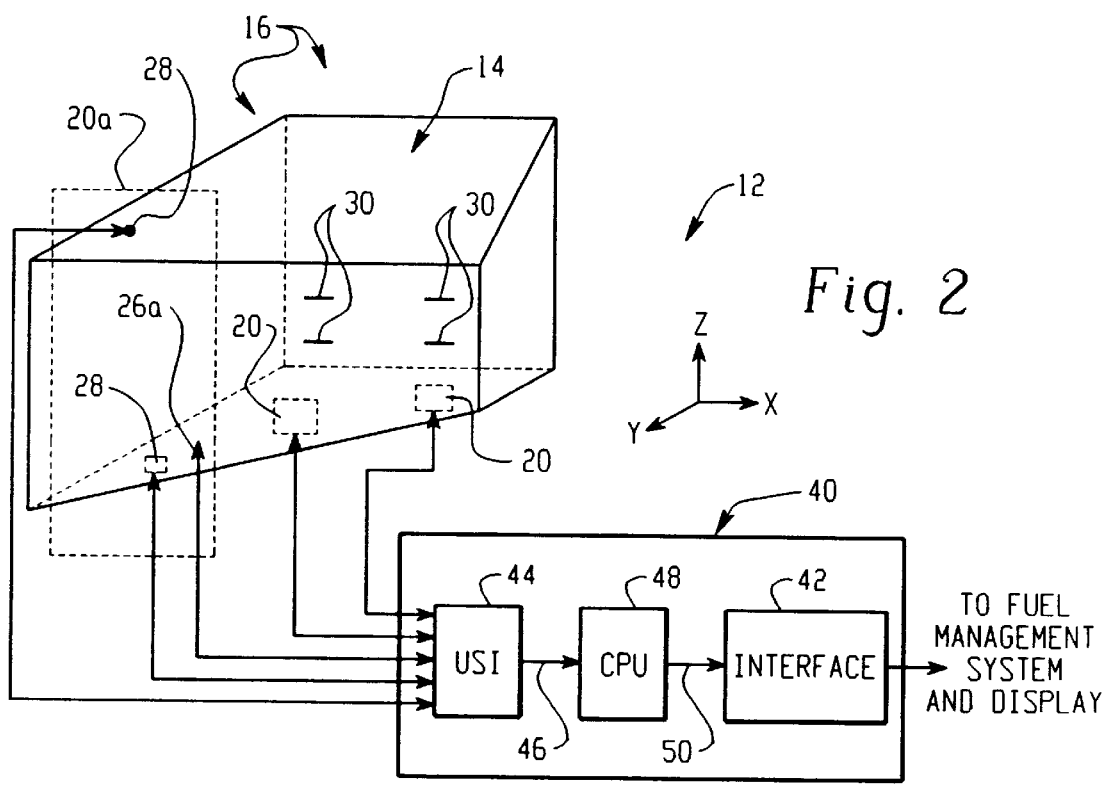
FIGS. 2 and 2A are a more detailed schematic of the fuel gauging system of FIG. 1 showing the basic architecture thereof, with a sensor suite concept shown in FIG. 2A.
Figure 2A:
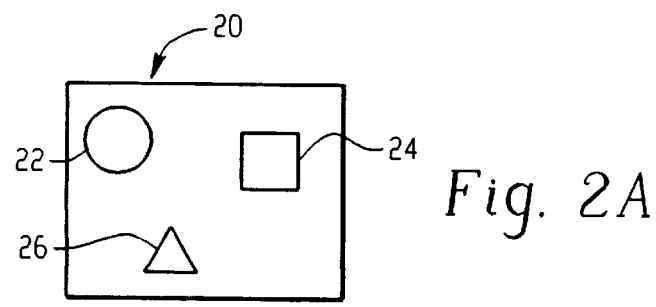

With reference next to FIGS. 2 and 2A, the fuel gauging system 12 includes the sensors 16 which are in FIGS. 2 and 2A illustrated in more detail as to organization. It is contemplated that a number of sensor suites 20 will be used with a fuel tank 14. Each sensor suite 20 includes, in one embodiment, an ultrasonic level sensor 22, a temperature sensor 24 and an accelerometer 26. Another sensor suite 20a (indicated by the dashed box 20a in FIG. 2) is embodied in the form of a differential pressure sensor 23 and another accelerometer 26a. In the event that fuel stratification is to be taken into consideration (due to temperature stratification, for example), additional pressure sensor suites can be used at different heights within the tank 14.

The ultrasonic type sensor suites 20, of which there are two used in this example, respectively include a pair of acoustic targets 30. The targets are used to permit a determination of the velocity of sound (VOS) through the fuel 13. The targets 30 can be disposed inside the tank 14 and are simply physical elements that serve as acoustic energy reflectors. It is contemplated that rigid fixed structural elements that are inherently part of the tank 14 design (such as for example, pipes, walls an so on) can be conveniently used for the acoustic targets 30, thereby obviating any need to add any structures to the tank 14 interior.

As noted herein, it is preferred but not required that all the sensors 22, 24, 26, 26a and 28 be non-intrusive. In FIG. 2A the sensors 22, 24 and 26 are schematically represented using different geometric shapes (e.g. a circle for the ultrasonic sensor 22, and a triangle for the accelerometer 26) to emphasize that the invention contemplates the use of a number of different sensors that detect or measure different parameters of the fuel, such as pressure, acceleration and temperature. It is the fusion of the information collected from the different sensors 16 that is one of the fundamental underlying concepts of the present invention, as will be described shortly. The particular grouping of various sensors into "suites" is also not a requirement to practice the present invention. Different groupings can be used, or the sensors not physically grouped at all.

Design details of each ultrasonic sensor used in a suite 20 are disclosed in the above incorporated U.S. patent application Ser. No. 08/996,747. However, the sensors 16 need not be organized as sensor suites, and can be conventional devices. A suitable ultrasonic sensor 22 could also be part no. 20182-0101 available from Simmonds Precision Aircraft Systems, Inc.; a suitable temperature sensor 24 is a standard temperature sensor such as part no. 8752 available from Norwich Aerospace; a suitable pressure sensor 28 for sensor suite 20a is part no. 19C030A-4 available from Sensym Inc.; and a suitable accelerometer 26 is part no. ADXL05EM-3 available from Analog Devices. The accelerometer 26 is preferably a three axis accelerometer that outputs acceleration information as the aircraft maneuvers. The pressure sensor 28 is preferably disposed at the maximum depth of the tank 14, and conveniently can be a differential pressure sensor so that the pressure measurement is inherently compensated for ullage and ambient pressures.

The gauging system 12 further includes a computer system 40. The computer system 40 may be part of the airplane fuel management system computer (not shown), or a separate processing unit that interfaces with the fuel management system through an appropriate interface function 42. The computer system 40 includes a hardware and software architecture that controls the overall operation of the fuel gauging system 12, including control of the sensor 16 operation, executive management of the various fusion algorithms, and control of the interface with down stream processing functions. Details of a suitable software architecture for the computer system 40 are provided in the above incorporated pending patent application Ser. No. 08/996,151. The present invention, however, does not depend on nor does it require the use of an overall executive computer system 40 as part of the fuel gauging system 12. Rather, the present invention is directed to liquid gauging using sensor fusion and data fusion concepts, carried out by a processor 48, that can be implemented in combination with or apart from an overall fuel gauging computer system such as the system 40.

The computer system 40 includes a universal sensor interface (USI) section 44. The main function of the USI 44 is to control and activate the various different sensors 16 and to receive, process and format the outputs from the various sensors 16. The USI 44 provides the sensor 16 output information in the form of a data stream 46 to a sensor fusion and data fusion processor 48. A detailed description of the USI 44 section is provided in the above incorporated patent application Ser. No. 08/997,271. However, the resent invention does not require use of the USI 44, but rather can alternatively utilize any of a number of conventional circuits well known to those skilled in the art that process the raw sensor 16 output signals and present the sensor 16 output information in a format that is compatible as an input to the processor 48.

The processor 48 carries out the functional and computational aspects of the present invention based on the data stream received from the sensors 16. The processor 48 may be the main processing unit for the computer system 40, or can be a parallel or interfaced separate processing device (thus comprising a computer system 40 for the gauging system 12) with its own hardware and software to carry out the functions described herein after. A suitable processor could be part no. 486 processor available from Intel Corporation. Thus, the present invention, in terms of a fuel gauging system 12, contemplates use of a processor 48 that receives the sensor 16 outputs and determines fuel quantity in one or more of the tanks 14. This processor 48 and its related functions can be integral with or separate from or utilized without the overall higher level computer system 40 architecture described in the above incorporated patent applications. The processor 48 can be realized in the form of a microprocessor, a RISC processor, DSP or combinations thereof, for example.

The processor 48 provides an output 50 that can be in any format compatible with the overall fuel management system that will use the data for further analysis and display. It is contemplated that the processor output 50 will include values that indicate quantity of fuel 13 in each tank 14 (or a cumulative quantity for all the tanks 14) expressed in terms of mass and/or volume as required, which quantity values are derived or calculated from sensor fusion and/or data fusion algorithms. The processor output 50 may also include parameter values that are determined from a fusion of the various sensor 16 outputs, such as density, pressure, temperature, VOS, liquid height and so on all of which can be intermediate values determined as part of the process for deriving quantity, but which may individually and collectively be useful to the fuel management system for other purposes. As used herein, liquid/fuel height and liquid/fuel surface plane height are used interchangeably.

Figure 3:
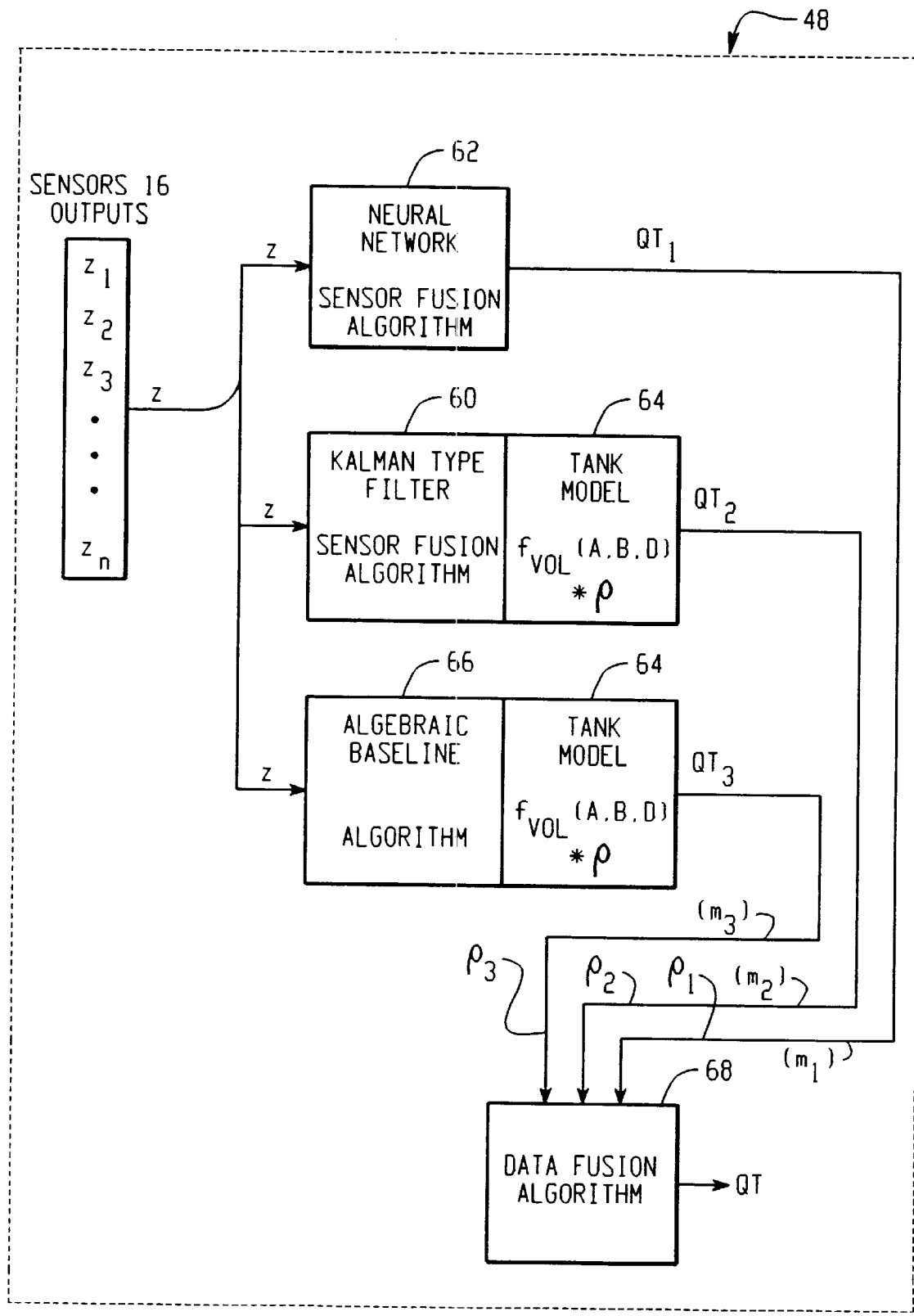
FIG. 3 is a functional block diagram of a processor that executes a number of fusion algorithms in accordance with the invention.

With reference then to FIG. 3, in accordance with another aspect of the present invention, the processor 48 receives the outputs from the various sensors 16 and executes one or more sensor fusion algorithms. In the described embodiment, the processor 48 executes two sensor fusion algorithms and also executes an algebraic baseline algorithm. As will also be described, the processor may also execute a data fusion algorithm.

Sensor fusion and data fusion are important aspects of the present invention. One of the fundamental concepts is that the fuel gauging system 12 is an over determined system. This means that there are more sensors 16 used than are minimally required to obtain a fuel quantity value. In other words, each sensor suite 20, 20a individually provides sufficient output data to derive a fuel quantity value based on a system model. For example, each of the ultrasonic sensor suites 20 includes an ultrasonic sensor 22 that transmits acoustic energy toward the fuel surface 11 (FIG. 1). Part of the acoustic energy is reflected back to the sensor 22 in the form of an echo. The time delay between when the acoustic energy is transmitted and when the echo is received is a measurement that is related to height of the fuel 13 in the tank 14. The measurement is not a direct height measurement because of variables such as VOS, temperature and acceleration. But the sensor suite 20 also includes a temperature sensor 24 and an accelerometer 26. These three sensor outputs from the suite 20 provide enough information that permit a determination of the fuel quantity, when used in combination with knowledge of the relationship between fuel height and volume for each tank 14 (referred to herein as the $f_{vol}(A,B,D)$ function). As another example, the differential pressure sensor suite 20a provides sufficient information to estimate quantity of fuel in the tank 14, because pressure is directly related to fuel height and density.

Each of the ultrasonic sensor suites 20 and the differential pressure sensor suite 20a plugs or screws or is otherwise mounted preferably non-intrusively to a tank 14 or part of a structure used to support the tank 14. The pressure sensor suite 20a and each of the ultrasonic suites 20, along with the associated accelerometer data, each are inherently fuel plane height sensors. That is, each sensor suite 20, 20a produces sufficient data to compute or estimate fuel volume (in combination with knowledge of the $f_{vol}(A,B,D)$ function, and/or other derived or assumed values such as density, for example). Use of the VOS targets allows the distance of the fuel plane from each ultrasonic sensor (u1 and u2 herein) to be determined. The acceleration vector provides the normal direction of the fuel plane (i.e. the direction of a vector that is normal to the surface) which information is needed because movement of the aircraft changes the orientation of the tank 14 (and hence the sensors 16) with respect to the fuel surface 11. Since the coordinates of the sensors 16 are known, the acceleration data can be used with the VOS data to compute the perpendicular distance of the fuel plane surface 11 from the bottom mounted pressure sensor 28. With pressure, temperature and distance known of the fluid column, a direct computation of the fuel density ρ can be made. VOS can also be estimated from derived and measured density and temperature, and density can also be estimated based on measured temperature and/or VOS. Thus, loss of a sensor suite 20, 20a, or even two sensor suites, does not result in complete system failure. And when all the sensor suites are functional, sensor fusion and data fusion permit increased fuel gauging system accuracy that is greater than any one of the individual sensors 16 or sensor suites 20, 20a can provide. It is important to note that the fuel gauging system 12 described herein achieves highly accurate fluid quantity measurements without the use of a densitometer or similar intrusive sensor. This allows a truly non-intrusive fuel gauging system 12 to be realized which is significant in the aerospace industry because of the advantage of isolating electrical energy sources from within the fuel tanks 14.

A system model of the fuel gauging system 12 can be based on a set of equations that define the various relationships between the plurality of sensors 16, and the system parameters that those sensors 16 measure, and the desired outputs such as quantity. FIG. 2B provides a complete set of the system 12 equations that pertain to the exemplary embodiment herein. The invention can be used with any gauging system 12 and for a different system 12, different or additional system equations may be needed, which can easily be determined in a manner analogous to the techniques described herein for the exemplary system 12.

As used herein, the term "system model" refers to numerous aspects of the overall system 12 design, including but not limited to the system equations of FIG. 2B, tank geometry, sensor location, sensor outputs representing parameter measurements, sensor inaccuracies and system dynamics (e.g. acceleration and environment). Thus, in general, a system model refers to a set of relationships, mathematical or otherwise, between measured parameters, derived parameters and quantity of liquid in the tank.

Thus, the gauging system 12 is over determined in that there is provided a plurality of sensors 16 that measure different parameters that in various combinations can separately result in a determination of fuel quantity in a tank 14. It is worth noting that although the two ultrasonic sensor suites 20 use the same type of sensors therein and operate in a similar manner, for purposes of sensor fusion and data fusion concepts the two ultrasonic suites detect different parameters in that the two suites are each positioned at different locations of the tank 14.

But the use of a plurality of sensors and sensor suites should not be construed as simply providing redundant information, as is commonly done with algebraically computed quantities. Algebraic computations can be used to solve the various system equations of FIG. 2B, and in one embodiment herein such an algebraic baseline is computed for purposes of data fusion (as described hereinafter). Algebraic computational methods, however, do not take into consideration uncertainties in the measurements and system level uncertainties; nor can the algebraic method take into consideration the interactions of the plurality of sensors. Algebraic methods at most can factor in corrections or compensation factors for known or expected inaccuracies, but system dynamics and other uncertainties can render those correction factors and compensation schemes no longer sufficiently accurate to result in a high accuracy in the final output. In an algebraic method, whatever value is assigned to the sensor output (including whatever compensations and correction factors one wants to make), for example, is the value that propagates throughout the algebraic equations and calculations. There is no ability to adjust the calculation dynamically based on uncertainty in the numbers used in the calculations.

The sensor fusion concept of the present invention, on the other hand, takes a significant leap beyond simple redundancy and algebraic computational limitations and fuses the sensor 16 outputs in a such a way that the accuracy of the final desired output value, in one example the quantity of fuel 13 in a tank 14 (in other examples, desired outputs in the form of measured parameters such as density, temperature, VOS and pressure), is substantially better than the accuracy achieved by each sensor suite alone or the accuracy achieved if the outputs are merely algebraically combined as in conventional gauging systems. Sensor fusion accomplishes this by including, in the process of determining a desired output, information related to noise, error and uncertainty that is present either in the sensor measurements or from other system 12 uncertainties and dynamic conditions. Rather than simply solving the algebraic equations as is done in the baseline technique, sensor fusion provides estimates of the system parameters and desired outputs. These estimates are based on statistical analysis and inherent uncertainties and variances of not only the sensor measurements but also system uncertainties that are not static and possibly cannot be directly known or predicted. Sensor fusion as used in the present invention does not even require that the system equations be solved every time the measurements are updated (at each Δt interval). For example, a neural net provides one embodiment of sensor fusion, wherein the neural net does not actually compute or solve the system equations of FIG. 2B, although the neural net is trained by data sets that inherently are governed by the system equations. To the extent that sensor inaccuracies, variances and system uncertainties are known and/or can be estimated with some accuracy, the sensor fusion and data fusion techniques provide an even more accurate estimate.

In the described embodiment herein, sensor fusion is carried out by the processor 48 executing one or more state estimation algorithms. Generally, state estimation is a process of computing the statistically optimal estimate of a desired output from multiple related noisy measurements. The state estimation process will inherently adjust its calculated output for events such as loss of sensor data or degradation of sensor data. State estimation techniques differ from traditional direct algebraic computational techniques, used heretofore in fuel gauging, by use of optimization methods and statistical properties of the system. In the embodiment of FIG. 3, there are two sensor fusion algorithms executed. These may be executed in parallel or at different times. One of the sensor fusion algorithms is a recursive filter such as a Kalman filter type algorithm 60. The other sensor fusion algorithm is a neural network 62.

As shown, both algorithms 60, 62 use all the outputs from the sensors 16 (the outputs are collectively shown as a measurement vector $z_m$ which includes outputs $z_1, z_2 \ldots z_n$ where n is the number of sensors or $z_m \epsilon(z_1, z_2 \ldots z_n)$. The measurement vector $z_m$ is updated at a rate defined by $\Delta t$ where $\Delta t$ is an update rate determined by the system designer and controlled by the computer 40. Both algorithms 60, 62 produce an output that is a desired output, in this case quantity $QT_i$ of fuel in the tank 14 associated with the sensors 16, where the subscript i in $QT_i$ denotes the algorithm. The quantity $QT_1$ is thus the quantity value determined by executing the neural net algorithm 62, and the quantity $QT_2$ is the quantity value determined by executing the Kalman filter algorithm 60. The value $QT_i$ that is output from the respective sensor fusion algorithms 60, 62 and 64 is in terms of volume. As indicated within the functional blocks 64, the value for density ($\rho$) can be multiplied by the computed volume to output $QT_i$ in terms of mass. Thus, each $QT_i$ is preferably in terms of mass ($m_i$), but could also be left in terms of weight or volume or any combination of the three, depending on the desired output information.

In these sensor fusion algorithms 60, 62, sensor measurement error/inaccuracy and system 12 uncertainty are taken into account in different ways, although both are statistically based. The recursive Kalman filter 60 operates based on a measurement noise covariance matrix and a process noise covariance matrix. A state vector is propagated in time along with its covariance matrix and each are updated for each measurement cycle via the Kalman gain and the measurement estimate error. The updated states are used to compute the desired output $QT_2$. The Kalman filter 60 reconciles inconsistencies between measured and predicted system performance. It may accomplish this by optimally blending actual measurements and predicted behavior using a blending ratio known as the Kalman gain "K". When the measurement error increases, the measurement error covariance is updated as is the Kalman gain to thus weight the output towards the predicted response; whereas if the measurement error improves (stated more precisely the measurement error covariance decreases) then the output is weighted towards the measured response. Another useful aspect of a Kalman type filter 60 is that an error covariance matrix $\Sigma$ is also propagated in time and can be used downstream as a confidence measure or bound for the determined output $QT_2$ for data fusion or other purposes, for example.

By comparison, the neural network 62 (also referred to herein as a neural net) is a state estimator that does not use an computational system model in its operation (although the neural net is trained based on input data derived or developed from a system model or analysis) but rather system model relationships are inherently accounted for within the training and learning process that is based on system model measured parameters and behavior data. The output from the neural net 62 is the desired output $QT_1$ or fuel quantity. The output $QT_1$ is computed directly from the measurement vector $z_m$ (i.e. the sensor 16 outputs) through non-linear activation functions. It is important to note that, although in the described embodiment herein the neural net sensor fusion algorithm 62 is used to compute the fuel 13 quantity in the tank 14, the same neural net 62 or an additional neural net (not shown) could be used to provide additional outputs such as the intermediate parametric values including but not limited to density, pressure, temperature and so on in a manner similar to the parametric data available from operation of the Kalman type filter 60.

In the embodiment of FIG. 3, the Kalman type filter algorithm 60 produces a state vector output of state elements that define the surface plane of the fuel 13 in the tank. This output vector thus includes data on the fuel height obtained from a fusion of the data from the sensor suites 20 and 20a (i.e. the two ultrasonic sensor suites and the differential pressure sensor suite), as well as pitch and roll information obtained by a fusion of the data from the various accelerometers. This information is then used to execute a height to volume transfer function $f_{vol}(A,B,D)$ where A is the roll value or sin(roll), this being the roll element of the unit vector that is normal to the liquid surface plane, B is the pitch value or sin(pitch), this being the pitch element of the unit vector that is normal to the liquid surface plane, and D is the height coefficient of the liquid surface plane along a unit vector defined by $[A, B, (1-A^2-B^2)^{1/2}]$. The transfer function $f_{vol}(A,B,D)$ can be realized, for example, in the form of a look-up table stored in a memory accessed by the processor 48. In the exemplary embodiment herein (FIG. 3), the transfer function $f_{vol}(A,B,D)$ that converts liquid surface plane data A,B,D to volume is realized by use of a trained tank model neural net 64. Thus, the complete sensor fusion algorithm 60 of a Kalman type filter includes a transfer function $f_{vol}(A,B,D)$ by which the desired output $QT_2$ is determined from the state vector.

The values A, B, D, $QT_1$ and $QT_2$ (and also $QT_3$ described below) are computed at each measurement interval. As shown in FIG. 3, an algebraic baseline algorithm 66 can also be used. Although this algorithm is not a sensor fusion algorithm, it provides additional useful data for a data fusion process 68 which will be described herein after. The baseline algorithm 66 produces yet a third estimate or calculation of the desired output $QT_3$. The algebraic baseline algorithm 66 produces fuel surface plane data similar in form to the output state produced by the Kalman type filter 60 (i.e. A, B, D are computed). Thus, the baseline algorithm 66 also uses a height to volume transfer function $f_{vol}(A,B,D)$, which can be effected by the same transfer function process 64 used with the Kalman type filter 60. If it is desired to compute $QT_2$ and $QT_3$ in parallel, then duplicate transfer functions $f_{vol}(A,B,D)$ can be provided.

At this point it can be noted that all the algorithms identified in FIG. 3 for the processor 48 can be carried out in software alone, hardware alone, or a hybrid of software and hardware. The algorithms can be carried out individually or in separate embodiments, or combined as in the exemplary embodiment herein, without deviating from the scope of the invention. Note that $QT_1$, $QT_2$ and $QT_3$ are values that are desired to be the correct value for quantity of fuel 13 in the tank 14. In the ideal world, $QT_1=QT_2=QT_3$ and is the correct quantity. Due to the inherent sensor and system uncertainties, however, these values will not always track. In accordance with another aspect of the invention, a data fusion algorithm 68 can also be executed by the processor 48. It is important to note that the data fusion algorithm 68 is a distinct computational process that can be performed independent of the sensor fusion algorithm if so desired, and further that the sensor fusion concept can be implemented with or without data fusion. Data fusion as used herein refers to a process of fusing or merging computed values of a desired output, in this case $QT_i$, from a plurality of different computations of that output, e.g. $QT_1$, $QT_2$ and $QT_3$. The data fusion algorithm 68 thus computes a best determinable or optimized calculation of the desired output $QT_i$. In the embodiment herein, the data fusion algorithm 68 can be realized by a Kalman-type filter, similar in operation to the recursive filter 60 and its alternatives as noted herein. The final QT output thus represents a computational analysis wherein the optimal estimate of QT takes into account the various uncertainties and confidence measures and other system 12 information associated with the different preceding methodologies for determining $QT_1$, $QT_2$ and $QT_3$.

As described with reference to FIG. 2, the fuel gauging system 12 in the exemplary embodiment uses several sensors 16. The sensor 16 outputs are stimulated and/or processed by the USI 44 and the corresponding sensor measurement output data is provided to the processor 48 in the form of the measurement vector $z_m$. The sensors 16 include two ultrasonic sensors that transmit acoustic energy to and receive acoustic echoes from the fluid surface 11, which echoes have measured round trip elapsed times of $t_{1f}$ and $t_{2f}$. The ultrasonic sensors also detect echoes from their respective VOS targets 30, and the corresponding echo travel times are measured as $t_{11VOS}$, $t_{12VOS}$, $t_{21VOS}$ and $t_{22VOS}$. The sensors 16 include three temperature sensors 26, 26a that produce outputs that are processed into measurement data outputs $T_{u1}$, $T_{u2}$ and $T_P$. The u1 and u2 subscripts refer to sensors or data associated with the ultrasonic sensor suites 20, and the P subscript refers to sensors associated with the pressure sensor suite 20a.

The sensors 16 also include the three accelerometers 26, 26a. Each accelerometer produces three output signals for the x, y and z components of the local acceleration vector, or $[a_x,a_y,a_z]_{u1}$, $[a_x,a_y,a_z]_{u2}$ and $[a_x,a_y,a_z]_P$.

The differential pressure sensor 28 produces an output that is processed to measurement output P. The measurement matrix $z_m$ therefore is a nineteen element vector as follows:

$$z_m \in \{t_{11VOS}\ t_{12VOS}\ t_{21VOS}\ t_{22VOS}\ t_{1f}\ t_{2f}\ T_{u1}\ T_{u2}\ T_P\ P\ a_{u1}\ a_{u2}\ a_P\}$$

where a refers to the respective three axis accelerometer data for each of the sensor suites (a total of 9 accelerometer output values in all). These nineteen measured parameters are provided as a measurement vector that is input to the Kalman filter type algorithm 60, and are also provided to nineteen respective input nodes of the neural net 62. These measurement values are also used for the baseline algorithm 66. Those skilled in the art will appreciate that the invention can also be realized without use of all the sensor inputs used in the exemplary embodiments, thus there can be different degrees of an "over determined" system based on the selected number of sensors used.

In addition to the measurement vector $z_m$, other data that is known is the distance of the fixed VOS targets 30 from the corresponding ultrasonic sensors 22. These respective heights are identified as $h_{11}$, $h_{12}$, $h_{21}$ and $h_{22}$ where the left subscript identifies the ultrasonic sensor and the right subscript identifies the associated target.

Figure 4:
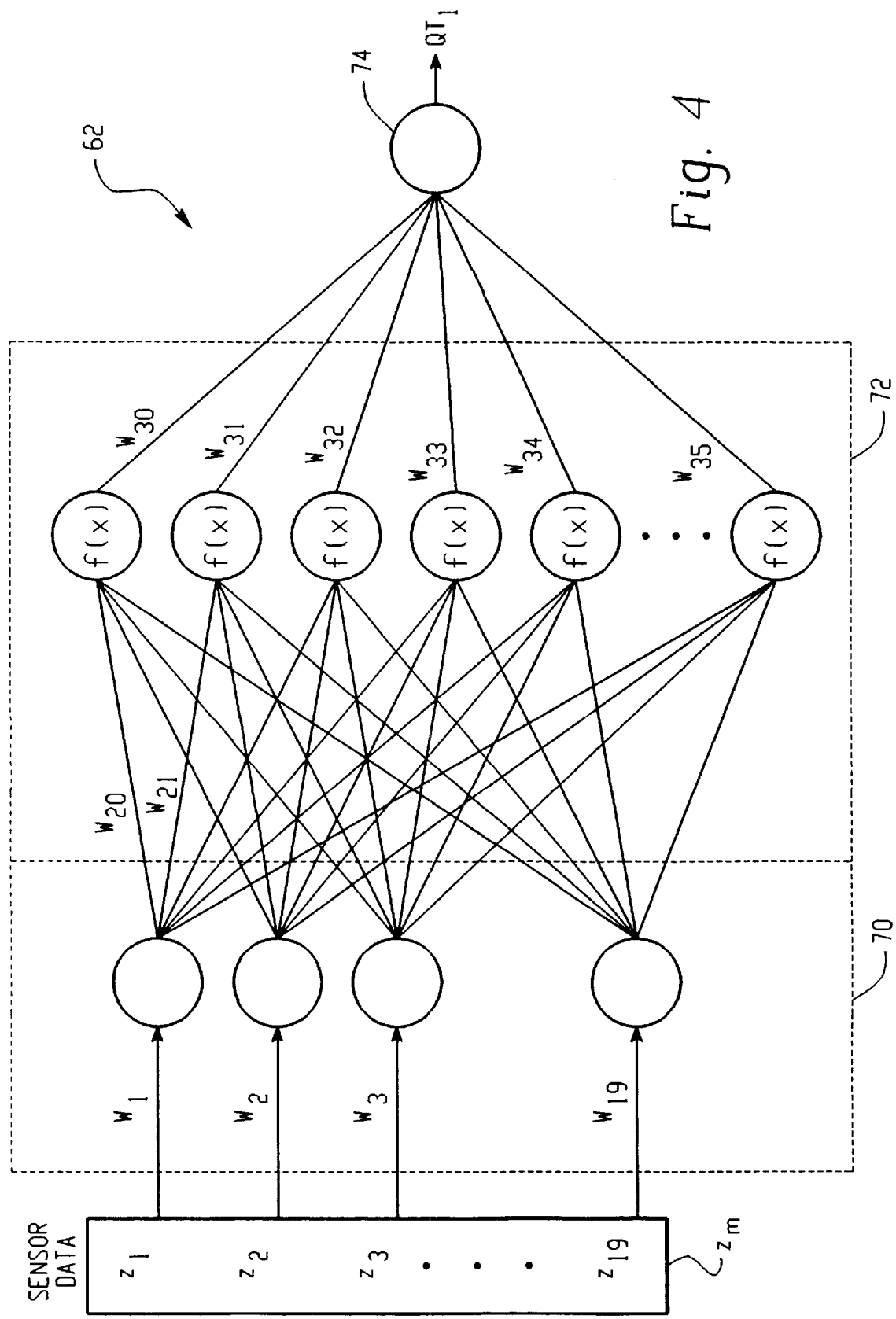
FIG. 4 is a schematic representation of a neural network architecture suitable for use with the present invention.

With reference to FIG. 4, the sensor fusion neural net 62 that is executed by the processor 48 is a feed forward three layer perceptron and receives the measurement vector $z_m$ with each of the nineteen measurement elements $z_1 \ldots z_{19}$ connected to a respective input node of the input layer 70 of the neural net. Each input value is weighted by a respective weight $W_1$, $W_2 \ldots W_{19}$. The neural net 62 includes one hidden layer 72 in this embodiment, with forty nodes, for example, in the hidden layer 72. Each of the input nodes in the input layer 70 is connected to each of the nodes in the hidden layer (in FIG. 4 most of the hidden layer connections have been omitted for clarity). Each of the connections between the nodes is also weighted, as is shown (again, most of the weight designations in FIG. 4 are omitted for clarity). Thus, an input to each of the nodes in the hidden layer 72 is a sum of all the weighted outputs from the nodes in the input layer 70. The neural net 62 also includes, in this embodiment, a single node output layer 74.

Each of the nodes in the hidden layer 72 are connected by weights to the output node layer 74. Thus, the input to the single node in the output layer 74 is the sum of all the weighted outputs from each of the nodes in the hidden layer. The output node 74 produces the desired output $QT_1$ of quantity S of fuel in the tank 14, in this case in terms of mass. Values move in the forward direction only in this neural net 62, from input nodes to the output node 74 through the nodes in the hidden layer 72. Values move from every node in the hidden layer 72 to the output node 74 by operation of a non-linear activation function f(x). In this exemplary embodiment, the activation function f(x) is the same for each node in the hidden layer 72 and is the sigmoidal function:

$$f(x)=1.0/[1-e^{-x}]$$

In other words, each hidden layer 72 node input, call it x, is the sum of all the weighted inputs from all the nodes in the input layer 70, and each hidden layer 72 node output is the sigmoidal function f(x). Other activation functions can be selected if appropriate for a particular application. The activation function of the output node is simply a linear sum function so that the output $QT_1$ of the output node 74 is simply the sum of all the weighted inputs received from each node in the hidden layer 72, and provides the quantity in units of mass.

Alternatively, if desired, the output $QT_1$ could be produced by a linear function that expresses the quantity in terms of volume or percent full volume, as an example. The density ρ can then be used to compute mass $m_1$ from $QT_1$. This volume to mass calculation could alternatively be carried out in the linear function of the output node 74. Note also that density could be a second output node of the neural net 62.

The neural network 62 is trained using a large number of input data sets. These data sets are obtained by process of computer simulation of sensor operation for an expected range of operating conditions. A first step would be to define a number of possible values of tank attitude, temperature, density, volume and so forth given the expected operating envelope of the aircraft. Then, for each combination of these values, the expected values of the sensor outputs are calculated using tank geometry and known nominal physical properties of the sensors, possibly including random measurement errors of the sensors. The calculated values of the sensor outputs for a single combination of the operating conditions form a single training data point for the neural net 62.

The weights are all randomly assigned prior to training, and the training is achieved using the back propagation algorithm as taught in *PARALLEL DISTRIBUTED PROCESSING*, Rumelhart, et al., The MIT Press, Cambridge, Mass. (1988). After training, the weights are stored and remain fixed. The neural net then operates in real time using data from the measurement vector $z_m$ and directly computes the desired output $QT_1$ at each measurement interval $\Delta t$. If desired, the output layer 74 can include more output nodes to provide a determination of parametric values such as density, temperature, pressure and acceleration, for example, requiring a more extensive training process.

Figure 5:
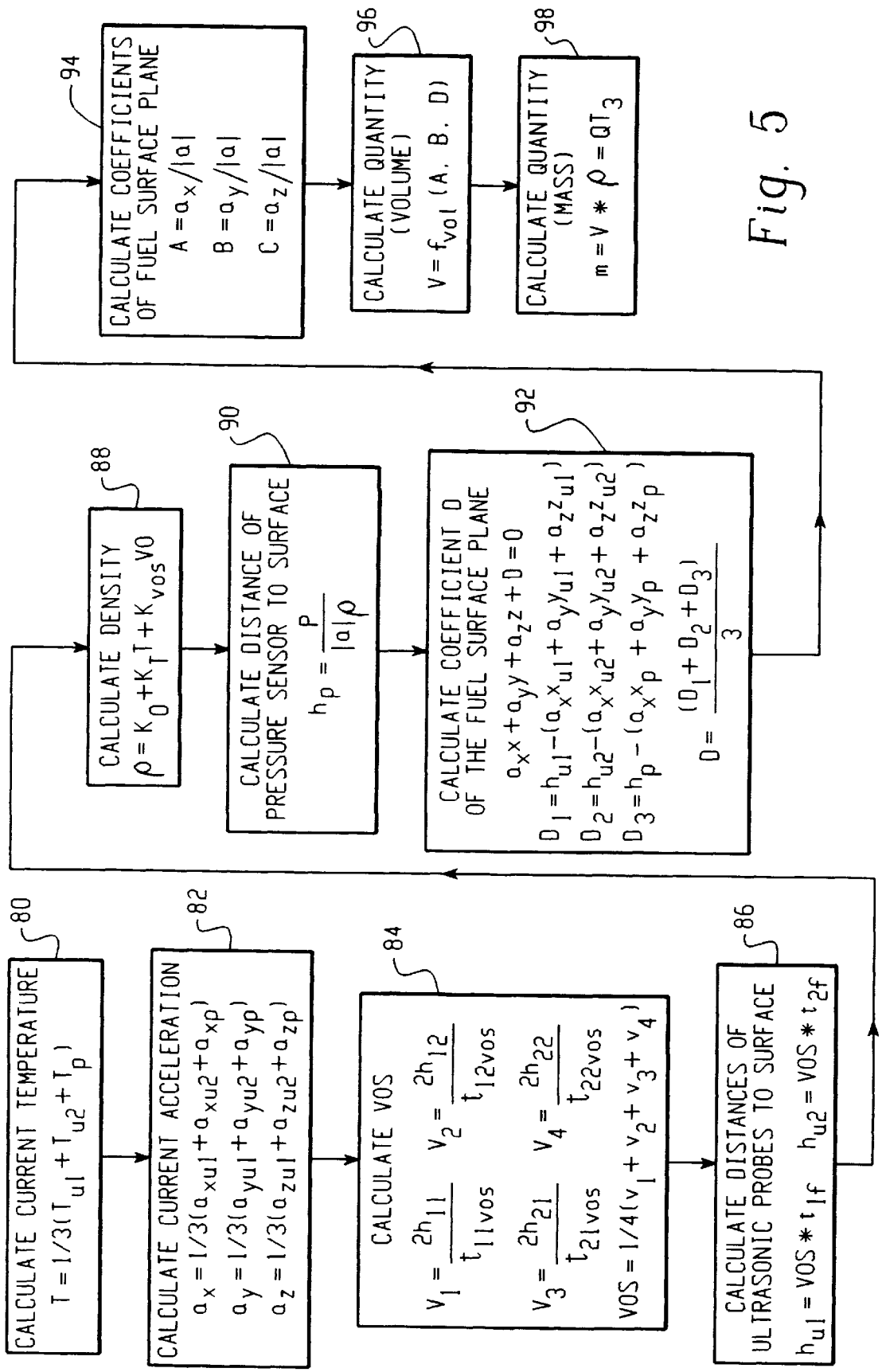
FIG. 5 is a flow diagram of an algebraic baseline algorithm that produces an output that can be used with the present invention for data fusion.

The algebraic baseline algorithm 66 executed by the processor 48 is shown in FIG. 5. At step 80 the fuel temperature is calculated as the algebraic average of the three temperature sensors in the sensor suites 20, 20a. At step 82 the current acceleration data is determined based on an algebraic average of the data from the three accelerometers associated with the sensor suites 20, 20a. At step 84 an algebraic average velocity of sound (VOS) is calculated. VOS can be determined by dividing two times the known distances of the acoustic targets 30 from their respective sensors, by the time delay of the echo from the target to be detected (each echo travels twice the known distance).

At step 88 the fuel density is determined. Note that the values of the constants $K_0$, $K_T$ and $K_{VOS}$ are determined empirically based on observed relationships between temperature, VOS and density for different fuel blends, such as by a least squares best fit determination. In the exemplary embodiment, $K_0=0.3558$, $K_T=0.012633$ and $K_{VOS}=1.167 \times 10^{-4}$. Fuel stratification can also be taken into consideration if required, as described in the above incorporated patent application Ser. No. 08/996,747.

At step 90 the calculated density is used to determine the distance of the fuel surface to the bottom pressure sensor 28 based on the measured differential pressure P and acceleration magnitude. Then at step 92 the height coefficient D of the fuel plane surface 11 from the local origin of the fuel tank along a unit vector formed by $(A, B, (1-A^2-B^2)^{1/2})$ (the fuel tank 14 has a local coordinate system with an origin that is used to determine the distance of the fuel surface 11 from the origin) is determined based on an algebraic average of calculations of D from the three sensor suites 20 data. In particular, the fuel heights calculated in steps 86 and 90 are used to determine the values of $D_1$, $D_2$ and $D_3$. Note that $D_1$, $D_2$ and $D_3$ are essentially computed from $h_{u1}$, $h_{u2}$ and $h_P$ respectively with appropriate adjustment of these heights as measured at the local tank coordinates for the sensor suite 20 locations (e.g. $x_{u1}$, $y_{u1}$ and $z_{u1}$). The heights $h_{u1}$, $h_2$ and $h_P$ are thus adjusted based on the sensor location coordinates and the acceleration vector data ($a_x$, $a_y$ and $a_z$) the latter which is normal to the fuel plane 13 surface by definition. These adjustments are needed because the fuel plane surface 11 orientation expressed in terms of the fuel tank 14 coordinate system changes relative to movement of the aircraft.

At step 94 the directional cosines (A) and (B) of the fuel plane 11 are determined (note that by definition, ROLL= $\sin^{-1}(A/\cos(\text{pitch}))$ and PITCH=$\sin^{-1}(B)$), and at step 96 the values A, B and D are input to the height to volume transfer function $f_{vol}(A,B,D)$ neural net 64 (FIG. 3) to compute $QT_3$. Alternatively, a look-up table, for example, could be used. The calculated volume V which can be the desired quantity $QT_3$ can then be converted to mass of fluid in the tank 14 at step 98 based on the calculated value for density. This quantity value is expressed in units of mass $m_3$.

The neural net 64 used for the tank model height to volume transfer function $f_{vol}(A,B,D)$ can be similar in architecture to the sensor fusion neural net 62, therefore, a detailed illustration is unnecessary. The height to volume neural net 64 thus is a three layer feed forward preceptor with an input layer, one hidden layer and a single node output layer. The input layer has three nodes for each of the variables A, B and D. There are ten nodes, for example, in the hidden layer with each node receiving as its input the sum of the weighted outputs from each of the three input nodes. The activation function for each node in the hidden layer is the same sigmoidal function as used in the sensor fusion neural net 62. The output node can simply be the sum of all the weighted inputs from all the nodes in the hidden layer, and this output is V or volume for a given A, B and D (height) input set of data.

The tank model neural net 64 is trained using the back propagation algorithm and an extensive data set of input value combinations for A, B and D. The tank model may also be alternatively expressed in terms of pitch, roll and D, or in terms of any other set of parameters which uniquely determine orientation of the fuel plane with respect to the tank 14.

The training set of inputs is derived from a CAD model of the fuel tank 14. An exemplary technique is described in the above incorporated patent application Ser. No. 08/997, 444, now U.S. Pat. No. 6,006,605, the salient details of which are as follows. Thus, in accordance with the invention, a computer model of the liquid container, in this case a fuel tank 14 is generated. A computer program such as for example CATIA® available from IBM is used to produce a solid model computer database of the tank. Other modeling programs could be used. This solid model database is based on the tank geometry provided by the tank manufacturer, such as from conventional CAD drawings of the tank. Thus the solid model database is defined by the geometric coordinates of the various surfaces and internal structures of the tank 14, in terms of the local x,y,z coordinate system of FIG. 2. Use of CATIA® to build solid tank model databases is well known to those skilled in the art and need not be further described herein in order to practice the present invention. The CATIA® program is actually used or can be used to produce a solid model of the entire aircraft. Thus, the present invention can be realized based on the assumption that the tank manufacturer or air frame manufacturer can provide the CATIA® database, or a solid tank model database from another modeling program, in an output format that is compatible with a solid model analysis tool such as PRO ENGINEER.

The solid model database is used as an input database to an analytical program tool such as PRO ENGINEER® available from Parametric Technology Corporation. This program, or others conveniently available including the CATIA® program, has the feature of being able to "slice" the solid model with planes at different heights in the tank. Each planar slice can be taken through the tank at a selected height $H_z$ above the tank origin, and thus corresponds to a simulated fuel or liquid surface height in the tank. For each slice taken, the analytical program tool can calculate the volume of the tank portion defined by where the slice was taken. These slices can also be taken at different pitch and roll attitudes. Thus, for each slice the tool produces a data entry set that defines the relationships between liquid height, volume, pitch and roll.

By incrementally slicing the entire tank for each incremental change in pitch and roll, the program tool is used to generate a large look-up table that defines all the relationships of liquid height to volume across all combinations of attitude in pitch and roll. Thus the database defines a height to volume function $f_{vol}(P,R,H_z)$ where $H_z$ is the fuel plane height above the origin of the arbitrary local coordinate system, R is the roll data value and P is the pitch data value. Typically, the pitch and roll limits for the tank will be specified by the aircraft manufacturer.

In many applications, particularly aircraft fuel tank applications, some pitch and/or roll attitudes of the tank may be more critical or important than other attitudes for fuel gauging purposes. The customer or end user may thus specify or assign an importance value to each attitude. In the exemplary embodiment, the importance value is between 0 and 1 inclusive with 1 being the highest importance and 0 being lowest importance. The importance values are provided through an importance table database as an input to the main tank model database. The importance data is used during training of the neural net 64 by using the importance data as an extra input to the net. An importance value, however, is used to scale the resulting error for each pattern, thereby modifying the amount of weight change that occurs as a result. For less important patterns, smaller weight changes are back propagated. This essentially affects the training rate, and results in a de-emphasis of certain regions of the function that the neural net is approximating.

The final tank solid model database then, in this exemplary embodiment, available for training the neural net 64, is the height to volume lookup table that establishes the relationships between $H_z$, pitch, roll and volume, with specific importance values assigned to various attitudes if required. The database thus provides all the data needed to simulate sensor operation of detecting the liquid surface, because the tank geometry is fully defined in terms of the local coordinate system, the sensor locations are defined by sensor position coordinates $(x,y,z)_s$ and the liquid surface height is defined by the $H_z$, P, R and volume relationships. Thus, simple trigonometry permits a determination of the fuel surface relative to each possible sensor position at every attitude and volume.

The importance data is not required for practicing the invention, and further need not be used together but could independently be incorporated into the training database as required for a particular application. In the exemplary embodiment, slice data is obtained in height increments of one inch at pitch and roll attitude increments of one degree and one-half degree, respectively. These values are exemplary.

Thus, the PRO ENGINEER program (or other suitable program) creates a geometric coordinate model of a tank based on the tank shape and architecture as input by the operator. The program further allows, through computer simulation, various fuel volumes to be assumed and provides output data of corresponding height coefficients (D) for each incrementally varied roll and pitch values (values A and B). Sensor location coordinates are also provided as an input to the program. The program essentially creates a large look-up table of the A, B and D values at various assumed volumes for a given set of sensor locations. These data sets are then used as the training set for the tank model neural net 64 to fix the weights of the neural net.

As noted, the location coordinates of the sensors 16 in terms of the local coordinate system of the tank 14 is input data for the PRO ENGINEER program used to determine the training data for the tank model neural net 64. The sensors 16 preferably are optimally located to reduce, among other things, sensitivity of the system 12 to fuel slosh and other dynamic effects.

Conventional sensor placement techniques are well known in the art and can be used as part of the overall process for developing the height to volume training data set for the tank model neural net 64. However, in accordance with another aspect of the present invention, an algorithm is provided for optimal location of the various sensors 16 by executing a genetic algorithm. This optimization tool is described in the above incorporated patent application Ser. No. 08/997,444, now U.S. Pat. No. 6,006,605.

Figure 6:
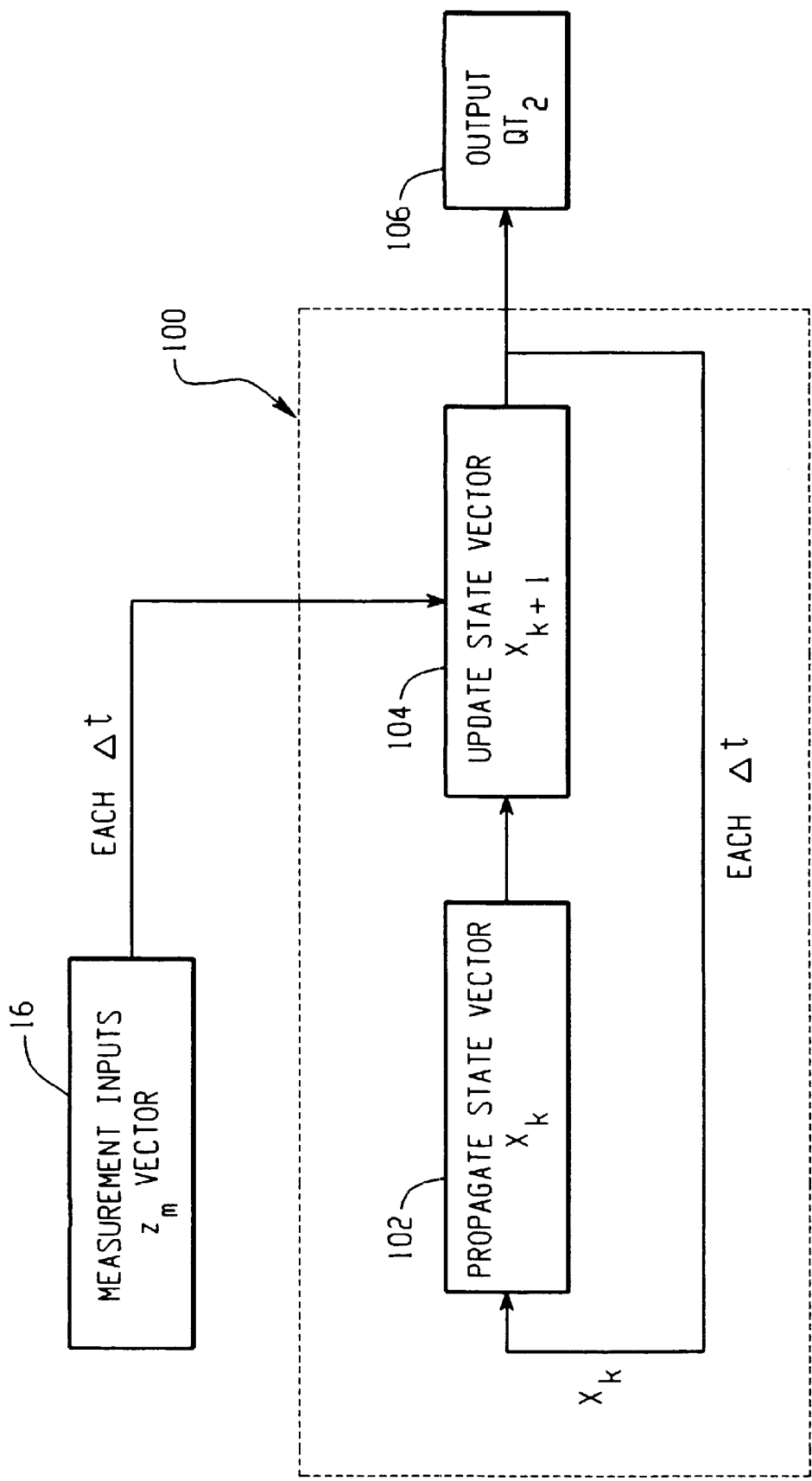
FIG. 6 is a functional block diagram of an extended Kalman filter algorithm for sensor fusion in accordance with the present invention.

With reference next to FIG. 6, a sensor fusion algorithm that uses state estimation techniques is provided in the form of a recursive filter 100. This algorithm is a Kalman type filter algorithm (the recursive filter 100 is a preferred but not exclusive embodiment of the Kalman type filter 60 in FIG. 3). In this embodiment, an extended Kalman filter (EKF) is used because of various non-linear relationships between the measurement vector $z_m$ (16) and a state vector $x_k$. The subscript "k" refers to the state vector at a point in time, k, so that $x_{k-1}$ is the state vector before it is propagated by the propagation equation 102 to the new state vector $x_k$. The subscript notation k+1 is used to refer to a predicted state, either in the measurement vector or the state vector. Thus, as an example, $x_{k+1|k}$ is the predicted state of the state vector $x_{k+1}$ based on measurement data up to time k. The state vector $x_k$ is propagated in time (at each $\Delta t$) along with its error covariance matrix and updated at 104 for each measurement by operation of the Kalman gain K and the predicted measurement error. The updated state $x_k$ is used to compute the output 106 or $QT_2$ in this embodiment. The output $QT_2$ is actually the result of applying the updated state vector $x_k$ as an input (or more precisely some of the state elements of $x_k$ such as A, B and D) to the height to volume transfer function $f_{vol}(A,B,D)$ (FIG. 3). This produces the quantity $QT_2$ in terms of volume, and this result can easily be converted to mass by multiplying the output 106 by density (where density is another of the state vector $x_k$ elements).

The state vector $x_k$ in this embodiment includes as state elements the following:

A=directional cosine of roll, or A=sin(roll)*cos(pitch)
B=directional cosine of pitch, or B=sin(pitch)
D=fuel plane height
VOS=velocity of sound
π=density
a=acceleration The system model used for an EKF algorithm is as follows:

$$x_{k+1}=f(x_k, w_k)=\Phi_k x_k + w_k$$

$$y_k=g(x_k)+v_k$$

where $x_{k+1}$ is the state to be estimated, $\Phi_k$ is the transformation matrix, $y_k$ is the measurement matrix (corresponding to $z_m$), $g(x_k)$ defines the relationships (in the exemplary embodiment, the relationships are non-linear) between the state vector and the measurement vector, $w_k$ is the process noise matrix and $v_k$ is the measurement noise matrix.

FIG. 8 identifies the predicted measurement vector relationship $g(x_k)$ that is calculated to determine the predicted measurement vector (i.e. $y_{k+1|k}$) based on the last state estimate $(x_k)$. This calculation is performed every update cycle, and specifically at step 154 of the algorithm of FIG. 7.

In the exemplary embodiment, the predicted state vector $x_{k+1}$ is assumed to be equal to the current state plus noise, or, $$x_{k+1}=f(x_k,w_k)=x_k+w_k$$

In other words, $\Phi_k$ is assigned the identity matrix (as such, $dx_k/dt=0$). This assumption is based on the $\Delta t$ increment being small compared to dynamic changes in the system 12 so that the estimated state vector $x_k$ is the same as the preceding state vector $x_{k-1}$ plus process noise. This non-dynamic system assumption, however, is not required to practice the invention but is used as a convenience to clarify the description of the preferred embodiment. Those skilled in the art will appreciate that the $\Phi_k$ transformation matrix could be used to define dynamic system 12 conditions using the off diagonal values.

For purposes of the disclosed embodiment, noise sequences are assumed to be independent and Gaussian with means of $E(v_k)=0$, $E(w_k)=0$ and variances $E(v_k\ v_k)=R_k$ and $E(w_k\ w_k)=Q_k$. $R_k$ is the variance matrix of the measurement noise, and $Q_k$ is the variance matrix of the process noise. These values can be functions of the system states and/or the measurement input. $R_k$ is estimated for each system 12 based on empirical knowledge. For example, in the described embodiment, the measurement noise is fairly predictable because the sensors 16 including the accelerometers, temperature sensors and pressure sensors, for example, tend to have identifiable output accuracy or tolerances. Thus it is straightforward to assign empirically a value in $R_k$ for each of the measurements in the measurement vector $y_k$. For the described embodiment, $R_k$ is a diagonal matrix, meaning that each measurement is considered to be independent of the other measurements, although this assumption is not required for the invention. The system process noise variance $Q_k$ is based on empirically estimated or predicted variability of the state variables induced by external environmental factors or modeling errors. It is noted again that both $Q_k$ and $R_k$ are estimated as best as the available knowledge of the system 12 will allow, and the algorithm 62 will operate as a sensor fusion process even if the values for $Q_k$ and $R_k$ are not optimal. Determination of $Q_k$ and $R_k$ can be performed for the system 12 using techniques that are conventional for the design of Kalman-type filters.

The exemplary embodiment also assumes that the noise terms $w_k$ and $v_k$ are mutually independent, or $E(w_k\ v_k)=0$ or covariance of the measurement noise and process noise is zero. The purpose of the filter is to calculate estimates of the unmeasured states $x_k$ at time k based on measurements y collected up to time k.

Figure 7A:
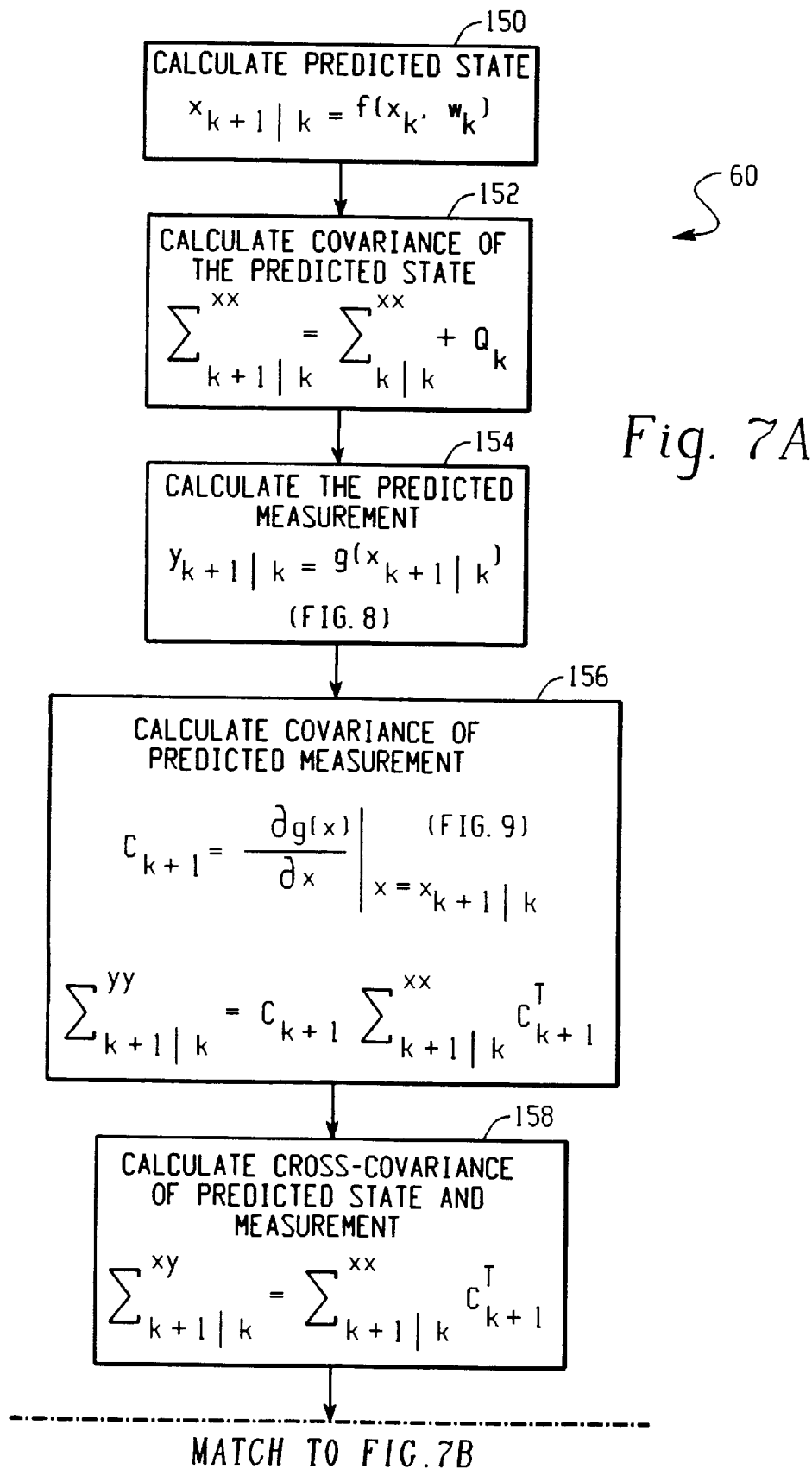
FIGS. 7a–7b are a flow diagram of one embodiment of a sensor fusion algorithm in the form of an extended Kalman filter (EKF)
Figure 7B:
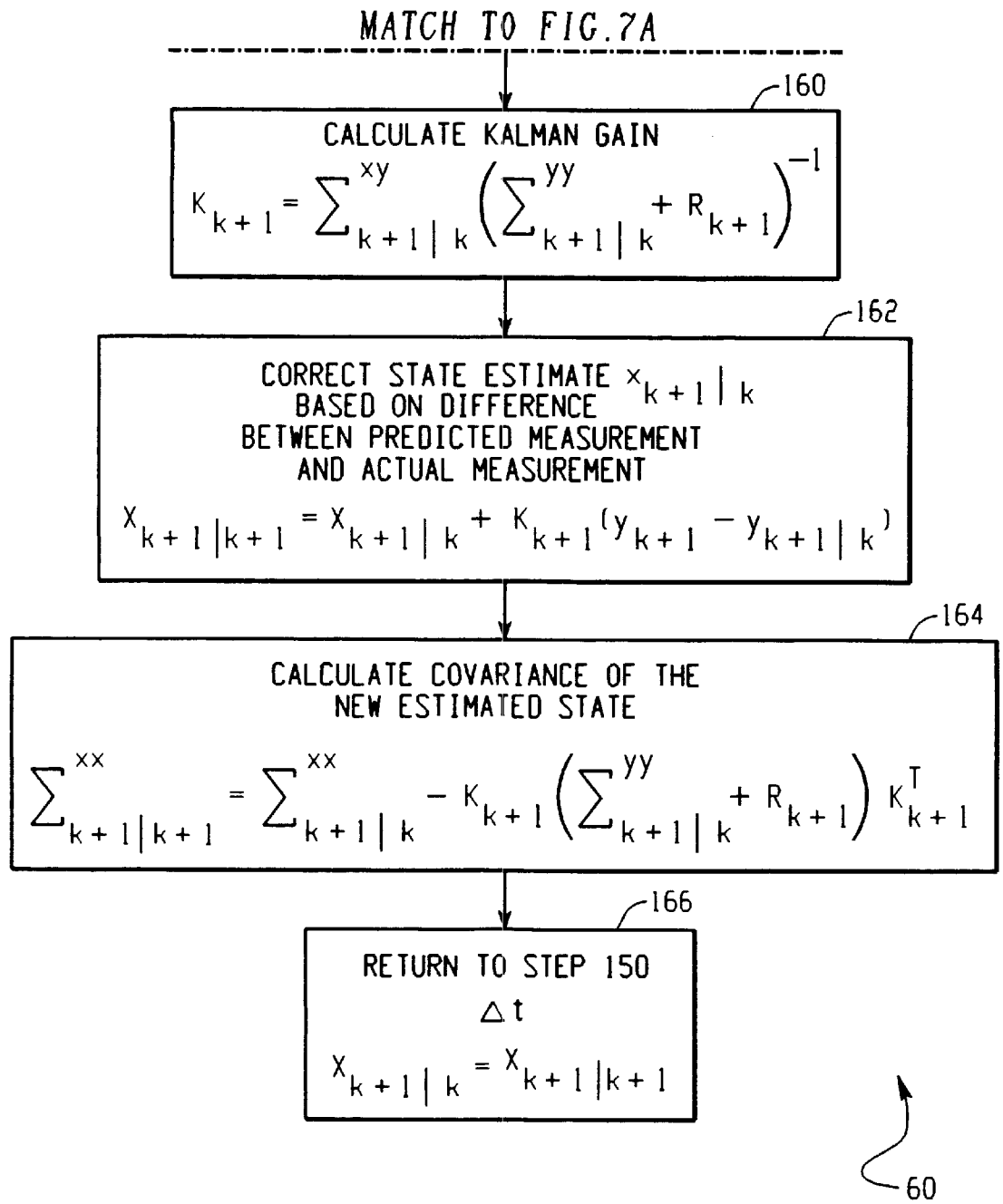

FIG. 7 provides an exemplary algorithm in flow diagram form for the EKF algorithm 62. At step 150, the predicted state $x_{k+1|k}$ is calculated based on the initial assumed state, which can simply be an assumed initial state estimate $x_{0|0}=x_0$. Also, for the initial condition of the Kalman filter, $w_k$ is assumed to be zero (the Kalman filter will adjust for the actual $w_k$ during subsequent iterations). Finally, the initial covariance must also be estimated $\Sigma^{xx}=\Sigma_0$ (the initial covariance estimate can simply be a guess, because the Kalman filter will operate to recalculate it at each $\Delta t$ interval).

At step 152 the covariance of the predicted state is calculated by adding $Q_k$ to the initial covariance $\Sigma_0$.

It is noted at this time that the algorithm illustrated in FIG. 7 is written in its generic form to show the calculations that occur for each recursion cycle (propagation and update). The initial cycle uses initial estimated values for the covariance values and state vector $x_k$ as noted above.

At step 154 the predicted measurement vector $y_{k+1|k}$ is calculated (in accordance with the $g(x_k)$ function of FIG. 8) using the initial state vector estimate $x_0$ (i.e. $y_{k+1|k}=g(x_{0|0})$). Note in FIG. 8 that the calculated perpendicular distances, such as for example, $\perp(A,B,D)_{u2}$ are calculated by the function:

$$D-(Au_x+Bu_y+(1-A^2-B^2)^{1/2}u_z)$$

where $(u_x,u_y,u_z)$ are the local coordinates of the sensor with respect to the tank 14 local origin. The function $g(x_k)$ is calculated using the estimated initial values $(x_0)$ for the state elements in the state vector $x_k$.

At step 156 the covariance $\Sigma^{yy}$ is calculated. Because the relationships between the state vector $x_k$ and the measurement vector $g(x_k)$ are non-linear, the covariance calculation is based on a linearization at point $x_{k+1|k}$ using the partial derivative of the $g(x_k)$ function with respect to $x_k$. This partial derivative is commonly referred to as the Jacobian matrix (identified in step 156 as the calculated matrix $C_{k+1}$). FIG. 9 shows the Jacobian matrix $C_{k+1}$ and this matrix, as well as its transform, is calculated for every recursion of the EKF algorithm as at step 156.

At step 158 the cross-covariance of the predicted state $x_{k+1}$ and the predicted measurement $y_{k+1}$ is calculated.

The predicted state vector $x_{k+1|k}$ is updated or corrected (to $x_{k+1|k+1}$) starting at step 160 at which step the Kalman gain $K_{k+1}$ is calculated. Note that this calculation makes use of the estimated R matrix (covariance of the measurement error).

At step 162 the state estimate is corrected or updated based on a calculated discrepancy (i.e. difference) between the predicted measurement $y_{k+1|k}$ and the actual measurement $y_{k+1}$. This set of values for the state vector (i.e. $x_{k+1|k+1}$) is the output of block 104 in FIG. 6. It also is propagated again (being used as the state estimate $x_k$ at step 150) as indicated by block 166 of FIG. 7 as the recursive filter 62 continues to operate using updated measurements after time $\Delta t$. The output $x_{k+1|k+1}$ is the updated estimated state vector and therefore includes the updated estimates for VOS, A, B, D, $\rho$ and a. The A, B and D values are input to the height to volume transfer function $f_{vol}(A,B,D)$ (implemented by the neural net 64 or alternatively a look-up table) to compute desired quantity $QT_2$ in terms of volume, and with the updated $\rho$ value can be converted to a desired $QT_2$ in terms of mass $m_2$.

At step 164 the covariance of the new state estimate is calculated, and this becomes the value used at step 152 in the next recursive cycle.

Those skilled in the art will appreciate that the exemplary EKF algorithm of FIG. 7 is but one example of a recursive Kalman filter type algorithm that can be used for state estimation. Other forms could be used including forms of Kalman filter algorithms with other methods of predicting future measurements and calculating cross-covariance matrices, including linear state transition and covariance intersection method, to name a few example. In some systems 12 alternatives to the Kalman type filter may be available, including condensation algorithms, for example.

With reference again to FIG. 3, the present invention also contemplates data fusion 68 techniques. Data fusion as used herein refers to the concept of using a plurality of determinations of a desired output, in the exemplary embodiments herein the plurality of determinations of the quantity $QT_i$, to further determine or estimate the desired output QT by fusing or combining the $QT_i$ data together to select the best one or a best estimate based on the plurality of $QT_i$ determinations. In the exemplary embodiment, the data fusion algorithm 68 can be realized in the form of a recursive filter, in a manner similar to the recursive filter used for the sensor fusion algorithm 60. Thus, a Kalman type filter can be used as an exemplary technique to effect a data fusion process in accordance with the invention. Other state estimation techniques, such as neural nets, could also be used. It is also noted at this point that alternatives to the Kalman filter technique (for both sensor fusion and data fusion herein) would include a rule based approach or fuzzy logic techniques.

As indicated in FIG. 3, the several quantity values $QT_i$ are expressed in terms of corresponding mass values $m_i$ since, for the exemplary embodiment of an aircraft fuel gauging system 12, mass of the fluid in the tanks 14 is important information. In the exemplary data fusion 68 embodiment herein, the data fusion inputs are the several $m_i$ quantity determinations from the sensor fusion algorithms 60, 62 and the baseline algorithm 66. These inputs may include respective uncertainty values ($\sigma_1$, $\sigma_2$ and $\sigma_3$ for the FIG. 3 embodiment) that are either assumed, empirically determined or determined by the respective sensor fusion algorithm (for example, the Kalman filter embodiment computes an associated uncertainty value for the estimated state vector).

The data fusion algorithm 68 in the exemplary embodiment is realized in the form of a Kalman filter. For the Kalman filter the system states are defined as $$x_k = (m_1 m_2 \ldots m_i)$$

The system equations can be expressed in conventional Kalman form as $x_{k+1} = \Phi_k x_k + w_k$ as described herein above. FIG. 10 illustrates a suitable form for the matrix $\Phi_k$ wherein it is assumed for this embodiment that $\Phi_k$ is linear. The measurement equation is of the form $z_k = H_k^* x_k + v_k$. This equation is conceptually the same as the above identified measurement equation $y(x_{k+1}) = g(x_k) + v_k$. The difference is that in the data fusion 68 embodiment, the measurement transformation matrix $H_k$ (which defines the relationships between the measurement vector to the state vector) is linear whereas for the sensor fusion algorithm 60 the relationships (i.e. $g(x_k)$) between the state vector and the measurement vector were non-linear.

The measurement vector Zk for the data fusion algorithm 68 is shown in FIG. 11. In the exemplary embodiment, i=3 as there are three mass determinations from sensor fusion 60, 62 and the baseline algorithm 66. The measurement transformation matrix $H_k$ is shown in FIG. 12.

The Kalman filter 68 carries out the recursive update operation $$x_{k+1} = x_k + K_k [z_k - H_k x_k]$$

which is a corresponding operation as was used in the EKF algorithm 60 (see step 162 in FIG. 7).

Figure 13:
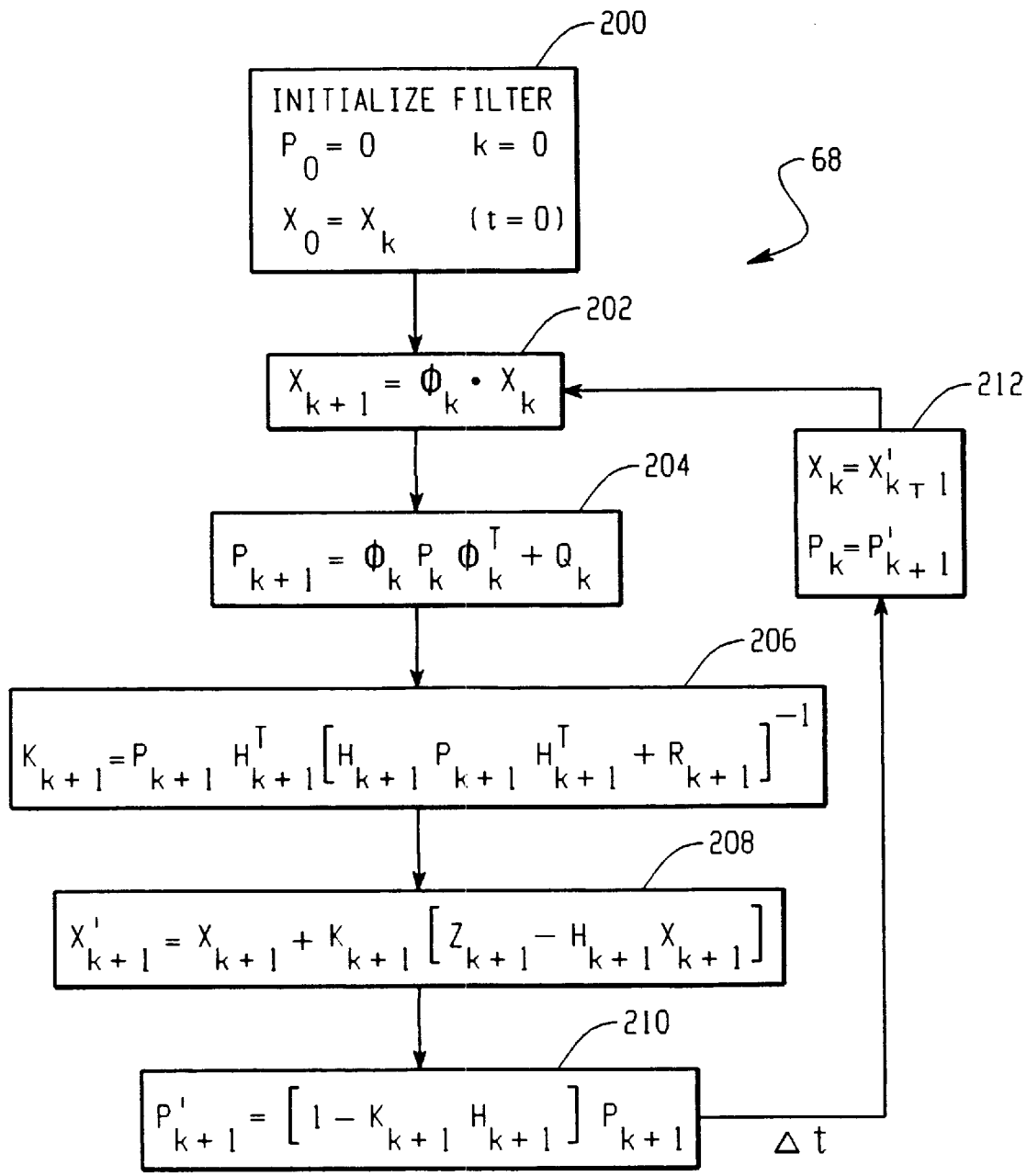
FIG. 13 is an exemplary data fusion Kalman filter type algorithm in flow diagram form.

The data fusion algorithm 68 as embodied in a Kalman type filter is shown in flow diagram form in FIG. 13. Note that in FIG. 13 the error covariance matrix is identified by the letter P. Also, as with the EKF algorithm 60, an empirically estimated variance $Q_k$ for the process noise $w_k$ is empirically determined, and the variance $R_k$ for the measurement noise $V_k$ is a function of the output uncertainty values ($\sigma_I$) from the sensor fusion algorithms as noted herein. These matrices are specific to the data fusion algorithm 68 and will not be the same as the matrices used for the EKF sensor fusion algorithm 60.

At step 200 the filter 68 is initialized wherein it is assumed that the error covariance P at state k=0 is assigned a value that reflects uncertainty of the initial values of the state vector, and further wherein an estimate of the state vector $x_k$ is estimated for state k=0.

At step 202 an estimate of the state vector at state k+1 is obtained. At step 204 an estimate of the error covariance P at state k+1 is calculated. At step 206 the Kalman gain is calculated for state k+1. These are the propagation functions of a Kalman filter (see block 102 of FIG. 6).

The update function (see block 104 of FIG. 6) is done at steps 208 and 210 of FIG. 13. At step 208, the calculated Kalman gain is used to update the earlier computed state vector estimate from step 202. Note that the updated state vector $x_{k+1}$ is denoted with a prime (') mark. The updated state elements can then be used to calculate (by operation of $H_k \cdot x_{k+1}$) the desired output quantity, mass QT. At step 210 the error covariance estimate from step 204 is updated using the Kalman gain calculated in step 206. The recursion then repeats as indicated at step 212 each measurement update cycle. Note that the update rate for the data fusion algorithm 68 can be but need not be the same as the update rate for the measurement vector $z_m$ in the sensor fusion algorithm 60.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. Liquid gauging system for liquid in a container, comprising: a plurality of sensors; each of said sensors measuring a respective parameter of the liquid in the container and producing a sensor output related to said parameter measured thereby; there being at least two sensors that measure different parameters of the liquid; and a processor that receives said sensor outputs and determines, based on said sensor outputs, a quantity of the liquid in the container; said processor determining said quantity by executing at least one sensor fusion algorithm that is based on a set of relationships between said measured parameters and said quantity.

2. The apparatus of claim 1 wherein said sensors are non-intrusive with respect to the container.

3. The apparatus of claim 1 wherein said sensors comprise an ultrasonic liquid level sensor for transmitting acoustic energy into the container from a sensor location outside the container.

4. The apparatus of claim 1 wherein the liquid comprises aircraft fuel and the container comprises an aircraft fuel tank.

5. The apparatus of claim 1 wherein said plurality of sensors include at least two sensors that measure a common parameter of the liquid in the container to provide redundancy data for said sensor fusion algorithm.

6. The apparatus of claim 1 wherein said sensor fusion algorithm comprises a state estimation algorithm.

7. The apparatus of claim 1 wherein said sensor fusion algorithm comprises a neural network that has been trained using a training data set of values for said measured parameters and said determined quantity.

8. The apparatus of claim 1 wherein said sensor fusion algorithm comprises a Kalman filter that uses a state vector having state elements that are a function of said measured parameters.

9. The apparatus of claim 8 wherein said sensor fusion algorithm is based on a system model comprising a number of state equations that define relationships between said state elements and said measured parameters.

10. The apparatus of claim 9 wherein said state equations include non-linear relationships and said Kalman filter comprises an extended Kalman filter.

11. The apparatus of claim 1 wherein said measured parameters of the liquid are selected from the following group: temperature, pressure, echo travel time, acceleration, and capacitance.

12. The apparatus of claim 1 wherein said sensor fusion algorithm determines a set of derived parameters including height of a plane of the liquid surface in the container, velocity of sound (VOS), density, dielectric constant, and pitch and roll related characteristics of the container.

13. The apparatus of claim 12 wherein said sensor fusion algorithm further comprises a height to volume algorithm that converts said liquid surface plane parameter and pitch and roll related characteristics to a volume of the liquid in the container.

14. The apparatus of claim 13 wherein said volume is converted to mass of the liquid in the container based on a density value of the liquid, said algorithm being executed based on a height to volume look-up table.

15. The apparatus of claim 13 wherein a neural network performs said height to volume algorithm.

16. The apparatus of claim 15 wherein said neural network is trained based on a geometric model of the container.

17. The apparatus of claim 1 wherein sensors are grouped in a plurality of sensor suites, with each sensor suite measuring parameters of the liquid which are sufficient to determine said quantity of the liquid that is related to mass of the liquid in the container.

18. The apparatus of claim 17 wherein at least one of the sensor suites comprises one or more of the following: an ultrasonic liquid level sensor, a temperature sensor and an accelerometer.

19. The apparatus of claim 17 wherein at least two sensor suites measure similar parametric properties of the liquid at different locations in the container to provide redundant data for said sensor fusion algorithm.

20. The apparatus of claim 17 wherein at least one of said sensor suites comprises one or more of the following: a pressure sensor, a temperature sensor and an accelerometer.

21. Liquid gauging system for liquid in a container, comprising: a plurality of sensors; each of said sensors measuring a respective parameter of the liquid in the container and producing a sensor output related to said parameter measured thereby; and a processor that receives said sensor outputs and determines, based on said sensor outputs, a calculation of a quantity of the liquid in the container; said processor determining said quantity by executing a sensor fusion algorithm that is based on a system model that defines a set of relationships between said measured parameters and said quantity; said sensor fusion algorithm comprising a recursive filter algorithm.

22. The apparatus of claim 21 wherein said recursive filter comprises a Kalman type filter.

23. The apparatus of claim 21 wherein said processor executes a second sensor fusion algorithm that is based on said sensor outputs and that is different from said first sensor fusion algorithm to determine a second calculation of said quantity of the liquid that is related to mass of the liquid in the container.

24. The apparatus of claim 23 wherein said second sensor fusion algorithm comprises a neural network that receives said sensor outputs and determines said quantity based thereon.

25. The apparatus of claim 23 wherein said processor executes an algebraic algorithm based on said sensor outputs to determine a third calculation of said quantity of the liquid that is related to mass of the liquid in the container.

26. The apparatus of claim 25 wherein said processor executes a data fusion algorithm based on said first, second and third calculations of said quantity.

27. The apparatus of claim 26 wherein said data fusion algorithm comprises a state estimation algorithm.

28. The apparatus of claim 26 wherein said data fusion algorithm comprises a Kalman filter that receives said first, second and third calculations of said quantity and produces an output that indicates a best determinable value of said quantity.

29. The apparatus of claim 21 wherein said sensor fusion algorithm computes a height parameter of the liquid surface, the apparatus further comprising a height to volume algorithm that converts said sensor fusion height information into a volume value.

30. The apparatus of claim 29 wherein said height to volume algorithm comprises a neural net.

31. Liquid gauging apparatus for liquid in a container, comprising: a plurality of sensors; each of said sensors measuring a respective parameter of the liquid in the container and producing a sensor output related to said parameter measured thereby; and a processor that receives said sensor outputs and determines, based on said sensor outputs, a first calculation of a quantity of the liquid in the container; said processor determining said quantity by executing a first sensor fusion algorithm that is based on a set of relationships between said measured parameters and said quantity; said sensor fusion algorithm comprising a neural network.

32. The apparatus of claim 31 wherein said neural network comprises a number of input nodes corresponding to said sensor outputs, and at least one hidden layer of and an output layer with at least one output.

33. The apparatus of claim 31 wherein said neural network produces an output that corresponds to volume of liquid in the container, said volume value being used to compute mass of the liquid in the container based on a density value of the liquid in the container.

34. The apparatus of claim 31 wherein said sensors comprise ultrasonic liquid level sensors, at least one temperature sensor, at least one pressure sensor, and at least one accelerometer.

35. Apparatus for determining quantity of liquid in a container, comprising a plurality of sensors that detect characteristics of a surface plane of the liquid; a processor that determines height and attitude parameters of the liquid surface plane, and a neural network that produces a quantity output based on said parameters, said neural network being trained by data sets derived from a computer model of the container.

36. The apparatus of claim 35 wherein said neural network is trained with data sets of attitude, height and volume information obtained from a computer based solid model of the container at incremental slices through the container.

37. Liquid gauging apparatus for liquid in a container, comprising: a plurality of sensors; each of said sensors measuring a respective parameter of the liquid in the container and producing a sensor output related to said parameter measured thereby; and a processor that receives said sensor outputs and determines said measured parameters by executing a sensor fusion algorithm; said sensor fusion algorithm comprising a state estimation algorithm.

38. The apparatus of claim 37 wherein said processor determines a quantity of the liquid in the container that is related to mass of the liquid in the container, based on said determined parameters.

39. The apparatus of claim 38 wherein said quantity is volume.

40. The apparatus of claim 39 wherein said parameters define surface plane location parameters including height of the liquid in the container, said sensor fusion algorithm further comprising a height to volume algorithm that converts said liquid surface plane parameters to a volume of the liquid in the container.

41. The apparatus of claim 40 wherein one of said parameters of the liquid is density, said processor determining mass of the liquid in the container based on said volume and density determinations.

42. Liquid gauging system for liquid in a container, comprising: a plurality of sensors; each of said sensors measuring a respective parameter of the liquid in the container and producing a sensor output related to said parameter measured thereby; and a processor that receives said sensor outputs and determines, based on said sensor outputs, a calculation of a quantity of the liquid in the container; said processor determining said quantity by executing at least two different sensor-based algorithms with each sensor based algorithm being based on a respective set of relationships between said measured parameters and said quantity; said algorithms producing respective outputs for said quantity; said processor executing a data fusion algorithm based on said algorithm outputs.

43. The apparatus of claim 42 wherein said sensor based algorithms are selected from the following group: a Kalman filter type algorithm, a neural net and an algebraic algorithm.

44. Fluid gauging apparatus consisting of at least one ultrasonic fluid level sensor, at least one pressure based fluid level sensor, at least one temperature sensor and at least one acceleration sensor, and a processor that computes mass of liquid in the container based on outputs from said sensors.

45. The apparatus of claim 44 wherein said processor executes a fusion algorithm to optimize computation of said mass of the liquid in the container.

46. The apparatus of claim 44 wherein said processor computes a height parameter of the liquid surface and density of the liquid based on measured velocity of sound in the liquid and measured differential pressure of the liquid in the container.

47. The apparatus of claim 46 wherein said processor computes a volume of the liquid in the container based on said height parameter, and computes mass of the liquid in the container based on said volume and said density.

48. The apparatus of claim 47 wherein said processor executes a height to volume algorithm based on said computed height parameter.

49. The apparatus of claim 48 wherein said height to volume algorithm comprises a neural net.

50. The apparatus of claim 44 wherein said sensors are non-intrusive.

51. The apparatus of claim 44 wherein said processor determines a respective uncertainty value for each computed mass value.

52. The apparatus of claim 51 wherein said processor executes a sensor fusion algorithm that produces an uncertainty value and an estimate of said mass.

53. The apparatus of claim 52 wherein said processor executes a data fusion algorithm that fuses a plurality of mass estimates, each said estimate having an associated uncertainty value.

54. A method for determining quantity of a liquid in a container, comprising the steps of:
   a) deriving data sets that relate liquid surface plane height, container attitude, and volume at different values thereof from a computer model of the container;
   b) using said data sets to train a neural net; and
   c) using the neural net to determine liquid quantity based on sensor signals that produce outputs used to derive height and attitude values for the liquid surface and the container respectively.

55. The method of claim 54 comprising the step of executing a genetic algorithm to determine positions of the sensors in the container, and deriving said data sets based on said sensor positions.

56. A liquid gauging system for liquid in a container, comprising: a plurality of sensors; each of said sensors measuring a respective parameter of the liquid in the container and producing a sensor output related to the parameter measured thereby; and a processor that receives said sensor outputs and determines, based on said sensor outputs, an estimate of a quantity of the liquid in the container by executing a neural network algorithm that is trained by data sets derived from a computer model of said system.

57. The liquid gauging system of claim 56 wherein the system computer model comprises a statistically based system model including noises and inaccuracies.

58. The liquid gauging system of claim 57 wherein the neural network algorithm is trained to solve the computer model of the system.

59. The liquid gauging system of claim 56 wherein the system computer model comprises sensor measurement noises and inaccuracies.

60. The liquid gauging system of claim 56 wherein the system computer model comprises system uncertainties.

61. The liquid gauging system of claim 56 wherein the system computer model comprises variations of liquid parameters.

62. The liquid gauging system of claim 61 wherein the variations of liquid parameters are selected from the group consisting of density, velocity of sound, dielectric constant and temperature.

63. The liquid gauging system of claim 56 wherein the system computer model comprises manufacture inaccuracies of system components.

64. The liquid gauging system of claim 63 wherein the manufacture inaccuracies include manufacture's tolerances of the container.

65. The liquid gauging system of claim 56 wherein the system computer model includes statistical properties of sensor and system characteristics.

66. The liquid gauging system of claim 56 wherein the system computer model comprises a computer simulation of system operation over a predetermined range of operating conditions.

67. The liquid gauging system of claim 66 wherein the operating conditions are selected from the group consisting of acceleration, attitude, temperature, and pressure.

68. The liquid gauging system of claim 56 wherein the system computer model comprises a computer model of the container.

69. The liquid gauging system of claim 68 wherein the container model includes a model of sensor placement in the container.

70. The liquid gauging system of claim 68 wherein the container model includes container properties selected from the group consisting of container type, shape, and manufacture's tolerances.

71. The liquid gauging system of claim 56 wherein the container comprises an aircraft fuel tank and the liquid comprises aircraft fuel.

* * * * *